Figure 1:
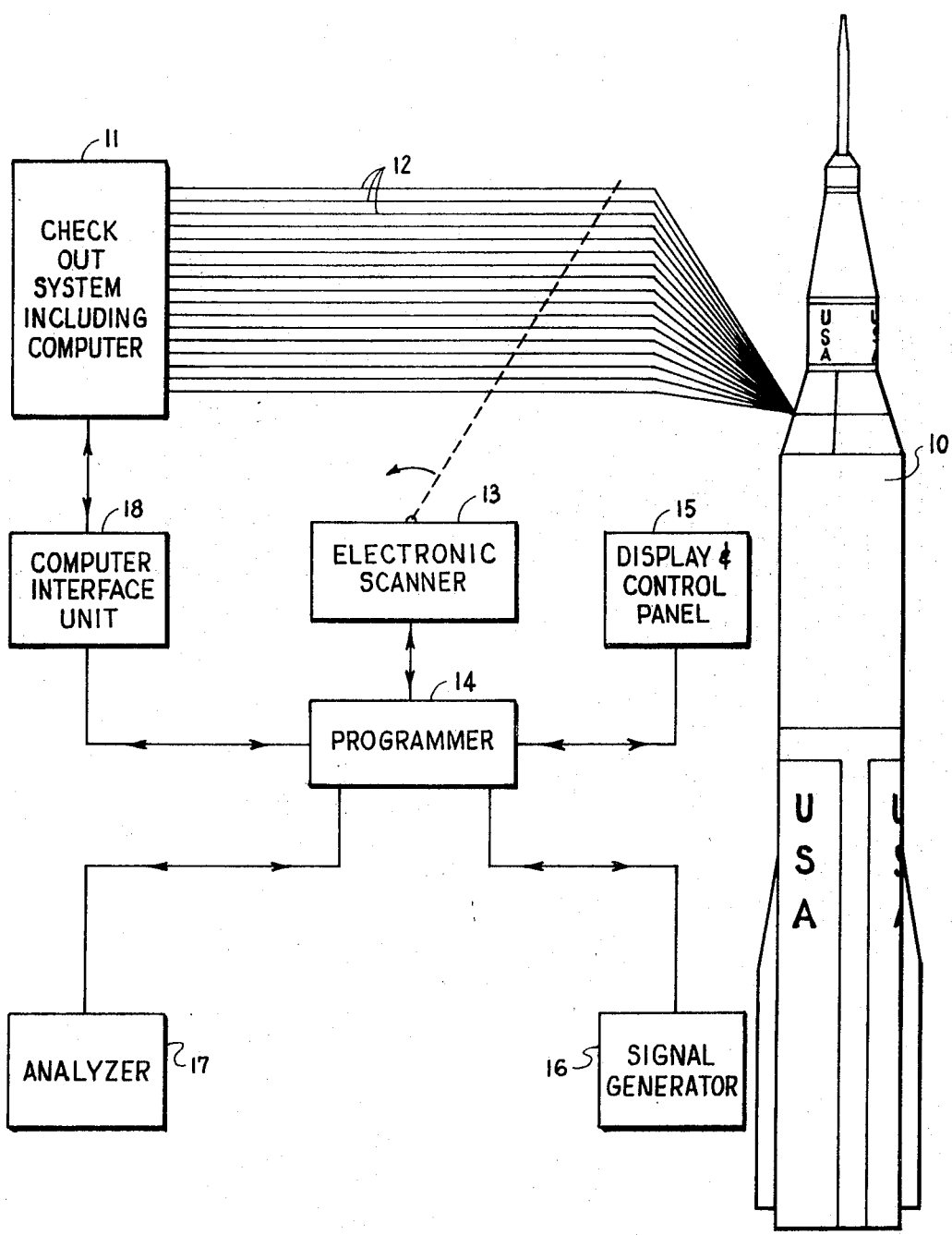

United States Patent
Richards et al.

[15] 3,665,303
[45] May 23, 1972

[54] SYSTEM FOR AUTOMATICALLY AND MANUALLY TESTING LINES FOR DETERMINING IF INFORMATION CAN BE ACCURATELY TRANSMITTED THEREON

[72] Inventors: Leo O. Richards, 8344 Sylvan Drive, West Melbourne, Fla. 32901; Walter E. Parsons, Route 1, Box 53 A, Kissimmee, Fla. 32741

[22] Filed: Dec. 4, 1969
[21] Appl. No.: 882,123

[52] U.S. Cl. ............................324/73, 324/51, 340/413
[51] Int. Cl. .................................G01r 15/12, G01r 31/00
[58] Field of Search ..................324/51, 66, 73; 179/175.25, 179/175.3, 18 FF; 340/413

[56] References Cited

UNITED STATES PATENTS

| | | | |
|---|---|---|---|
| 2,808,457 | 10/1957 | Carver | 340/413 X |
| 2,883,651 | 4/1959 | Akerlund | 340/413 |
| 2,905,520 | 9/1959 | Anderson | 340/413 X |
| 3,324,458 | 6/1967 | MacArthur | 340/154 X |
| 2,950,437 | 8/1960 | Stahl | 324/51 X |
| 3,219,927 | 11/1965 | Topp et al. | 324/73 |
| 3,237,100 | 2/1966 | Chalfin et al. | 324/73 |
| 3,246,240 | 4/1966 | Arnold et al. | 324/51 X |
| 3,299,220 | 1/1967 | Wedmore | 324/73 X |
| 3,323,059 | 5/1967 | Erickson et al. | 324/73 X |

Primary Examiner—Gerald R. Strecker
Attorney—James O. Harrell and G. T. McCoy

[57] ABSTRACT

A hardline monitoring system for monitoring a plurality of lines over which signals are transmitted in order to determine if the characteristics of the lines are within certain predetermined tolerances. The monitoring system includes a programmer, an electronic scanner, an analyzer, a display and control panel, a signal generator, a computer interface unit, and a checkout computer. In operation, the electronic scanner, which is under the control of the programmer, scans a plurality of hardlines or cables over which the signals are transmitted. The programmer, in turn, couples these lines through the scanner to an analyzer which analyzes the signals to determine if there is any distortion or deterioration of the line. If the signals being transmitted are out of tolerance, then the analyzer sends such information to a display and control panel to illuminate a lamp indicating such. Such information is also fed to a checkout computer through a computer interface unit and the programmer. A signal generator is provided for placing continuous data signals, FM signals and wordburst signals on the line when such is necessary.

10 Claims, 27 Drawing Figures

Patented May 23, 1972

3,665,303

20 Sheets-Sheet 1

INVENTORS
LEO O. RICHARDS
WALTER E. PARSONS
BY
James O. Harrell

MODE REGISTER PROGRAMER

INVENTOR.
LEO O. RICHARDS
WALTER E. PARSONS
BY James O. Harrell

Patented May 23, 1972
3,665,303
20 Sheets-Sheet 4
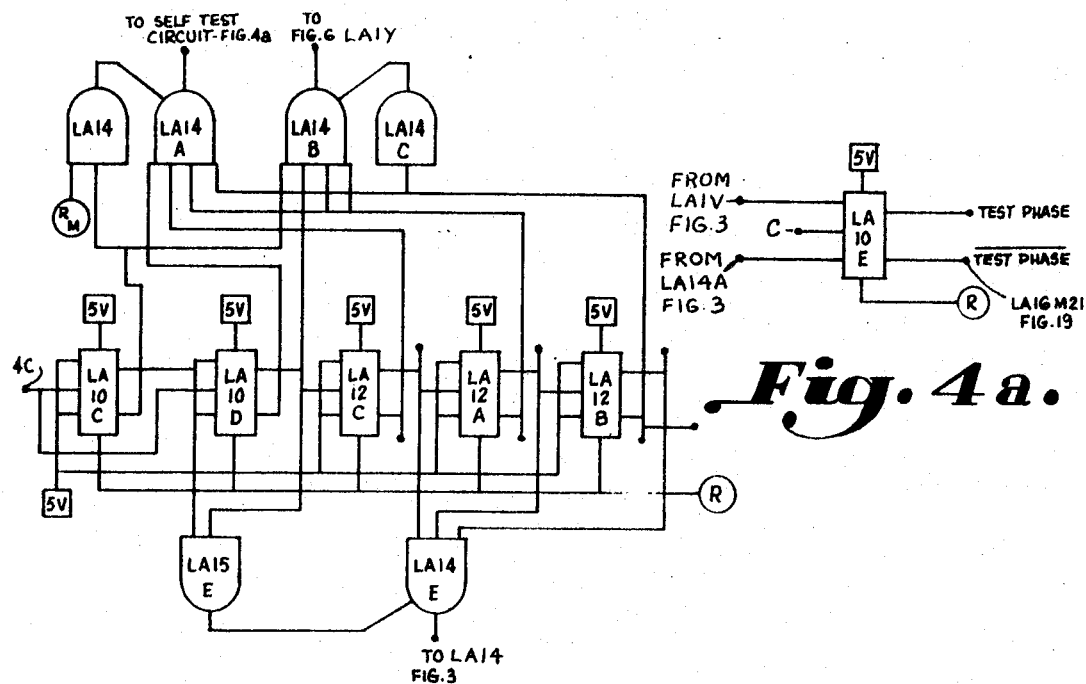
Fig. 4a.
Fig. 4.
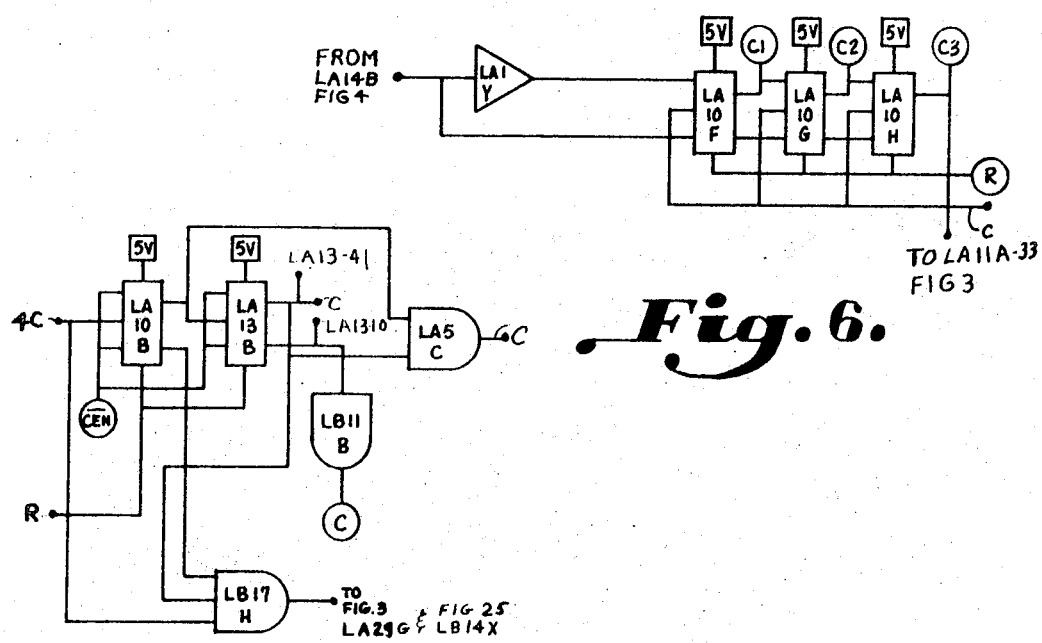
Fig. 6.
Fig. 5.
INVENTORS
LEO O. RICHARDS
WALTER E. PARSONS
BY
James O. Harrell

SCAN REGISTER

SCAN REGISTER (CONTINUED)

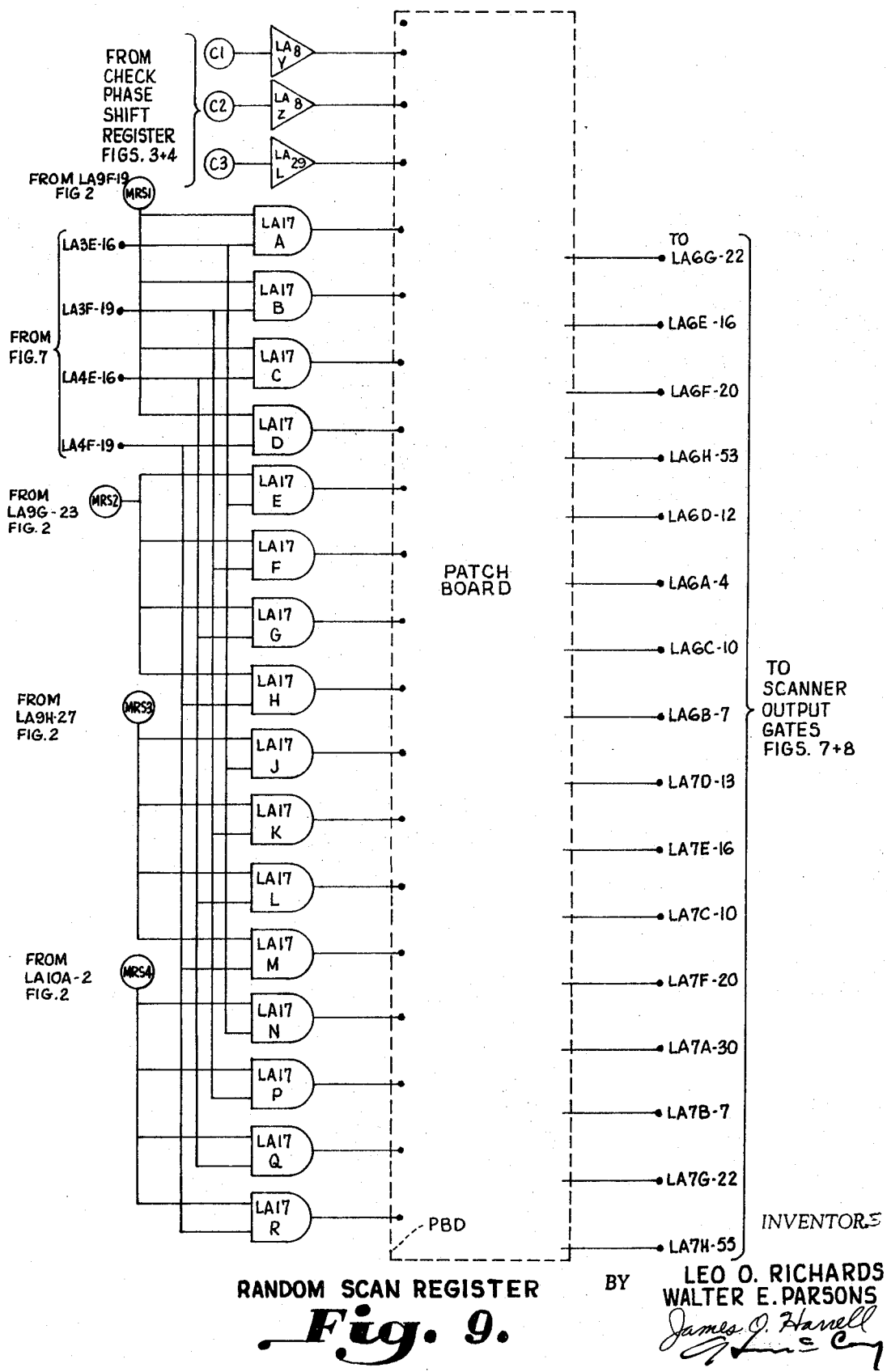

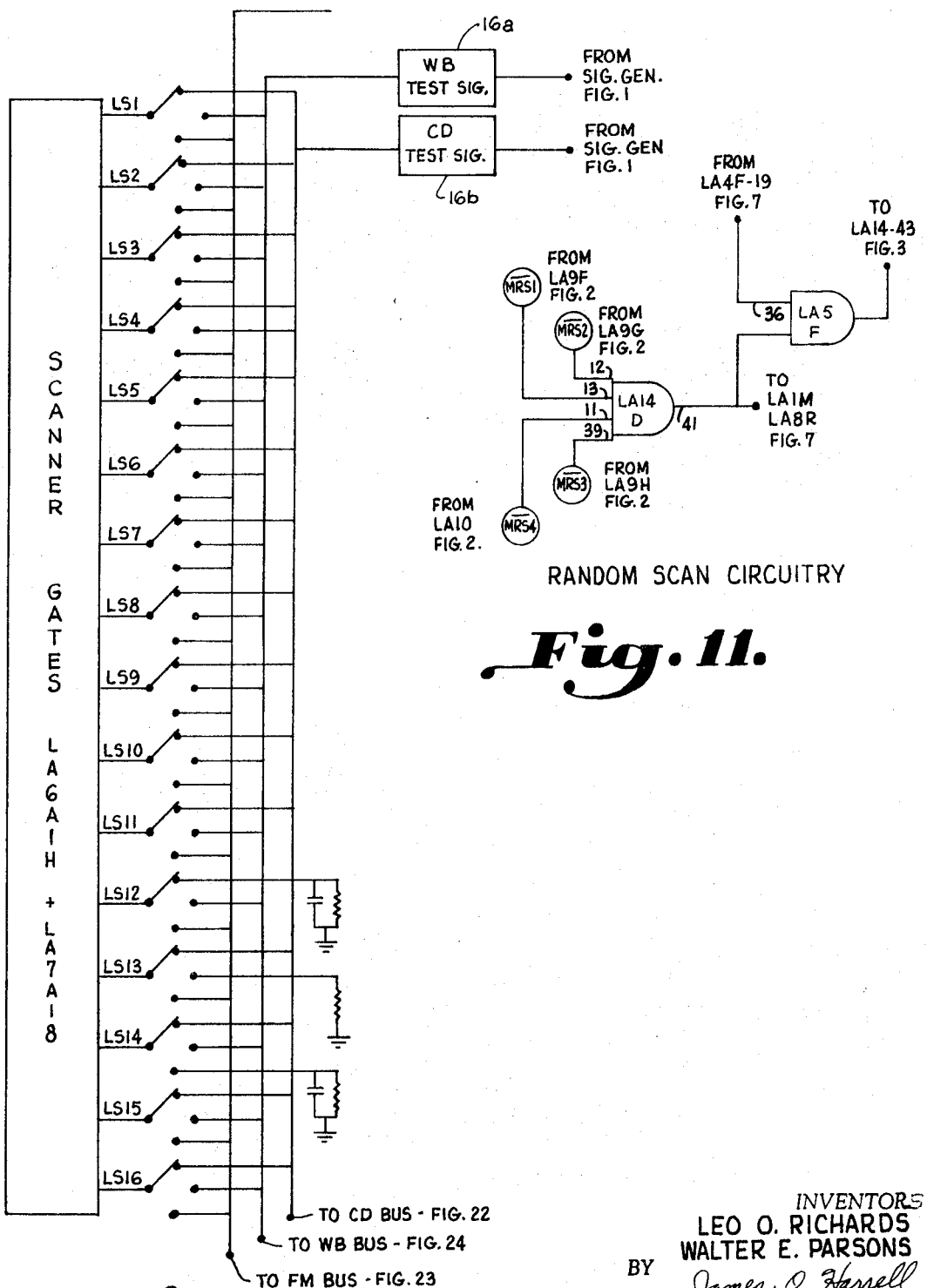

SWITCHES FOR STOPPING SCANNING

CONTINUOUS MONITOR

INVENTORS
LEO O. RICHARDS
WALTER E. PARSONS
BY James O. Harrell

WORD BURST CYCLE TIMER

INVENTORS
LEO O. RICHARDS
WALTER E. PARSONS
BY James O. Harrell

WORD BURST MONITOR

WORD BURST MONITOR (CONT.)

WB ANALYZER LOGIC

INVENTORS
LEO O. RICHARDS
WALTER E. PARSONS
BY
James O. Harrell

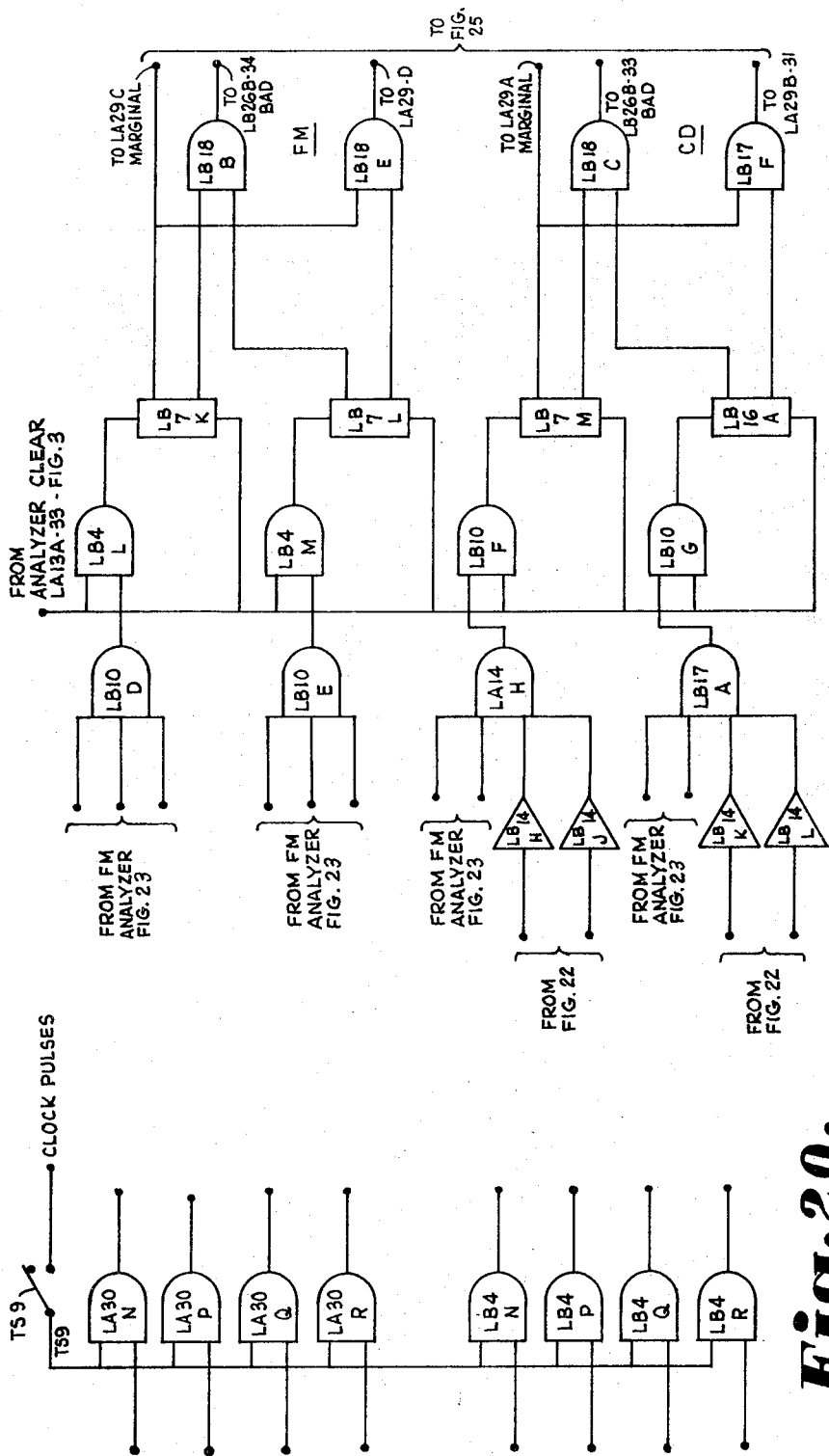

CD ANALYZER

WB ANALYZER

INVENTORS
LEO O. RICHARDS
WALTER E. PARSONS

INVENTORS
LEO O. RICHARDS
WALTER E. PARSONS
BY

INVENTORS
LEO O. RICHARDS
WALTER E. PARSONS
BY
James O. Harrell
John E. McCoy

SYSTEM FOR AUTOMATICALLY AND MANUALLY TESTING LINES FOR DETERMINING IF INFORMATION CAN BE ACCURATELY TRANSMITTED THEREON

The invention described herein was made by employees of the United States Government, and may be manufactured and used by or for the Government for Governmental purposes without the payment of any royalties thereon or therefor.

The invention relates to a system for monitoring a plurality of hardlines, and more particularly to a system for monitoring the characteristics of a plurality of hardlines in order to determine if the signals being transmitted thereover have deteriorated or are outside a given tolerance.

In launching space vehicles normally there is a command up-link circuit and a measurement down-link circuit between a computer and the space vehicle. The purpose of this is to send commands to the vehicle for taking measurements in the vehicle and return these measurements back down through the down-link portion of the system for display, data reduction and data retention. Normally, the link between the checkout computer and the space vehicle is through a plurality of wires. One of the problems experienced in using these hardlines between the computer and the space vehicle is bobble. Bobble is when a signal is being sent over the line and the base line of the signal is caused to shift. This, in turn, may change the character of the signal being sent, making such totally unacceptable or inaccurate when received. The purpose, therefore, of the hardline monitoring system is to look at the signals being generated by the computer and sent over the lines to the space vehicle so as to determine if any bobble is occurring. Another important feature of the monitoring system is to analyze the hardlines connected between the computer and the space vehicle in order to determine if the characteristics of such have deteriorated, or signals sent thereacross will deteriorate outside a given tolerance.

Therefore, in order that the computer sending commands to the space vehicle will not have any downtime as a result of a poor quality line, the hardline monitoring system is used to generate its own signals and, hence to analyze the line when the computer is not sending information down the line.

The deterioration of the characteristic of the line can be caused by a number of things, such as humidity, changes in temperature, direct sunlight thereon, someone pulling a plug somewhere in the system, and a variety of other well-known reasons, such as rerouting of the signals through different circuits which cause different impedance matches and inherent distortions if the line is not properly balanced, etc.

The hardline monitoring system is intended for use as an automatic, programmable, wave form analyzer which can scan and analyze the wave forms on any of a plurality of lines. The condition of the wave form on any sample line is then stored in a memory and displayed on a lamp panel. The hardline monitoring system has the following general capabilities: (1) Scan any continuous sequence of channels as preprogrammed in any of five modes, (2) scan any four random channels as preprogrammed in any four modes, (3) scan any wordburst channel automatically interrupting any other scan mode, (4) scan a desired set of three priority channels before any other scan mode is initiated, (5) report any loss of data on a continuous data line, (6) analyze and indicate the conditions of FM (frequency modulators), CD (continuous data), and WB (wordburst) wave forms on any channel as preprogrammed, and may be interfaced with a digital computer for automatic operation.

In accordance with the present invention, it has been found that difficulties encountered with variances in line characteristics and signals being transmitted thereover, may be overcome by providing a novel hardline monitoring system. This monitoring system, when used for monitoring a plurality of channels or hardlines, includes the following basic parts: (1) an electronic scanner provided for scanning a plurality of hardlines over which information is being transmitted, (2) a programmer coupled to a scanner for conveying signals to and from other components, as well as synchronizing the operation of the system, (3) an analyzer coupled to the programmer for receiving signals from the hardlines being scanned and analyzing the signals to determine if such are within a given tolerance, (4) a display and control panel coupled to the programmer for displaying information regarding the monitoring operation, (5) a signal generator coupled to the programmer for generating signals that can be used in testing the characteristics of the hardlines, and (6) a computer interface and a checkout computer for receiving and storing information collected during the monitoring operation.

Accordingly, it is an important object of the present invention to provide a hardline monitoring system for monitoring a plurality of hardlines to insure the characteristics permit signals to be properly transmitted thereover.

Another important object of the present invention is to provide a hardline monitoring system which is capable of being programmed to set-up priorities in monitoring certain lines, as well as producing a major sequential scanning operation of all the lines.

Still another important object of the present invention is to provide a hardline monitoring system for determining when any type of signals, such as for example, wordburst, frequency modulated and continuous data signals, are being transmitted within a given tolerance.

A further important object of the present invention is to provide a hardline monitoring system for monitoring signals being transmitted over a plurality of lines and to interrupt a predetermined scan operation when wordburst signals are transmitted thereover to insure that the line and signals are within certain tolerances.

Still another important object of the present invention is to provide automatic restoration of the lines that are under control of a computer.

A further important object of the present invention is to monitor a plurality of hardlines so as to determine if "bobble" is occurring when signals are being transmitted thereover.

Figure 2:
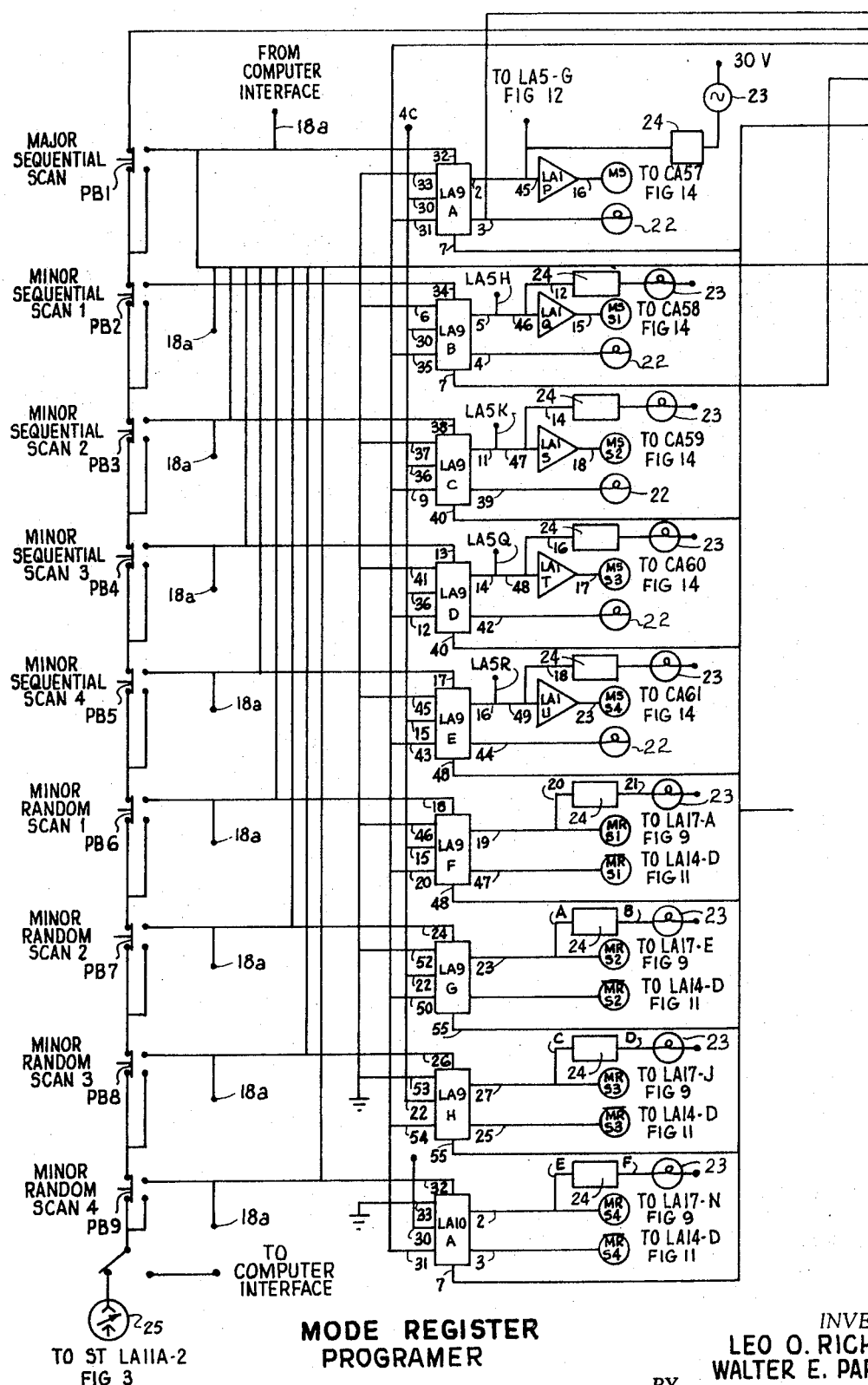
Figure 3:
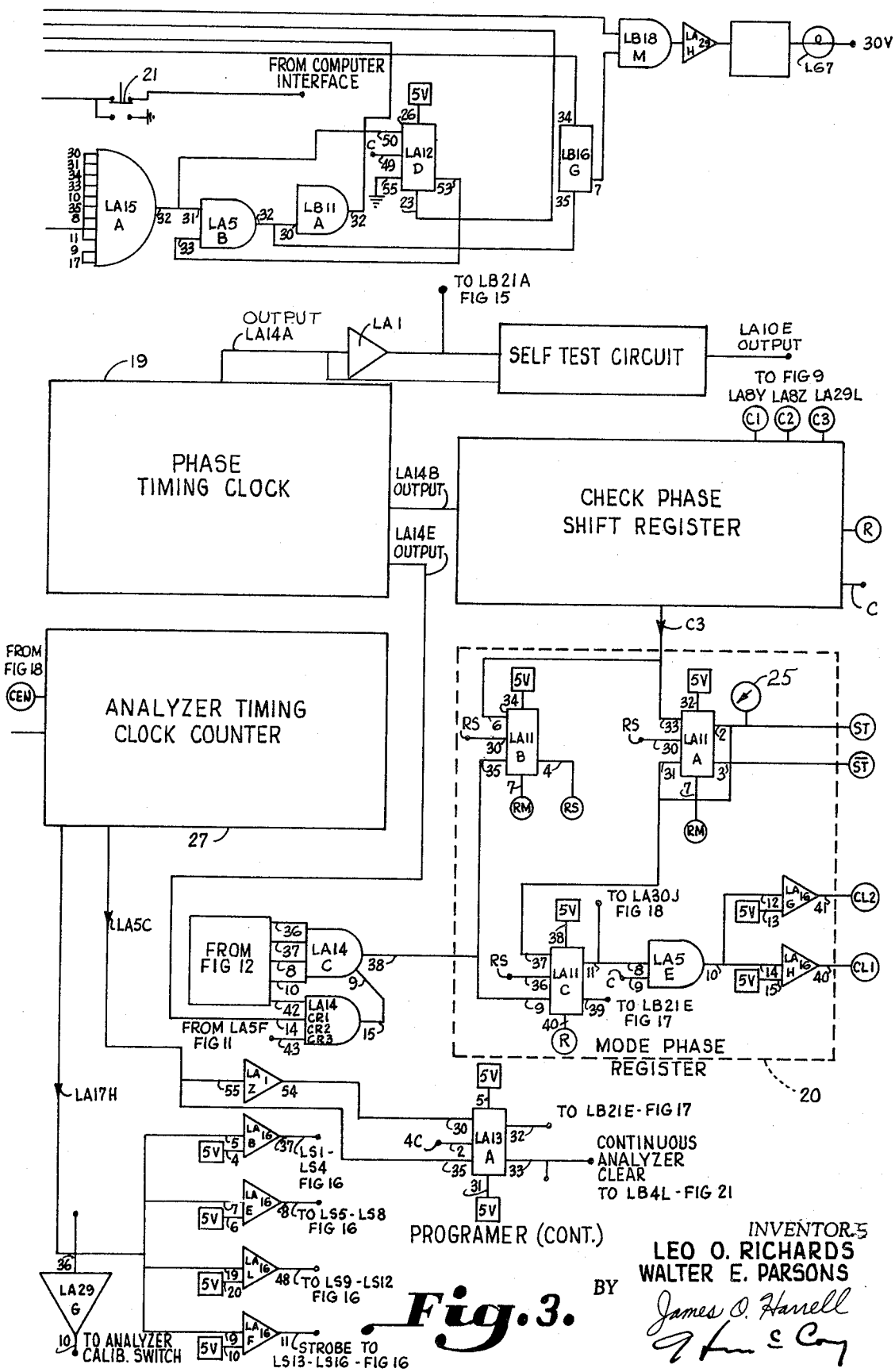
Figure 7:
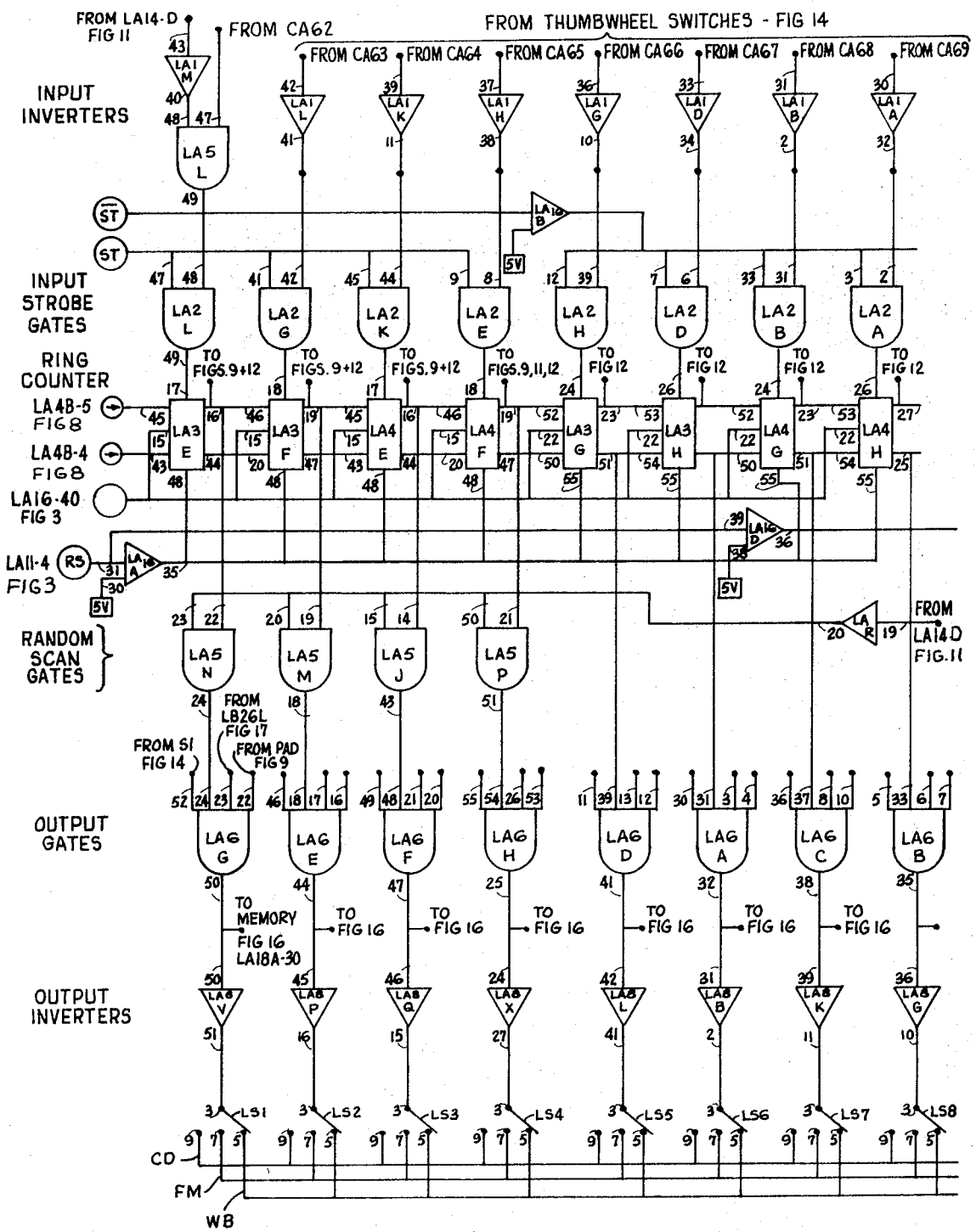
Figure 8:
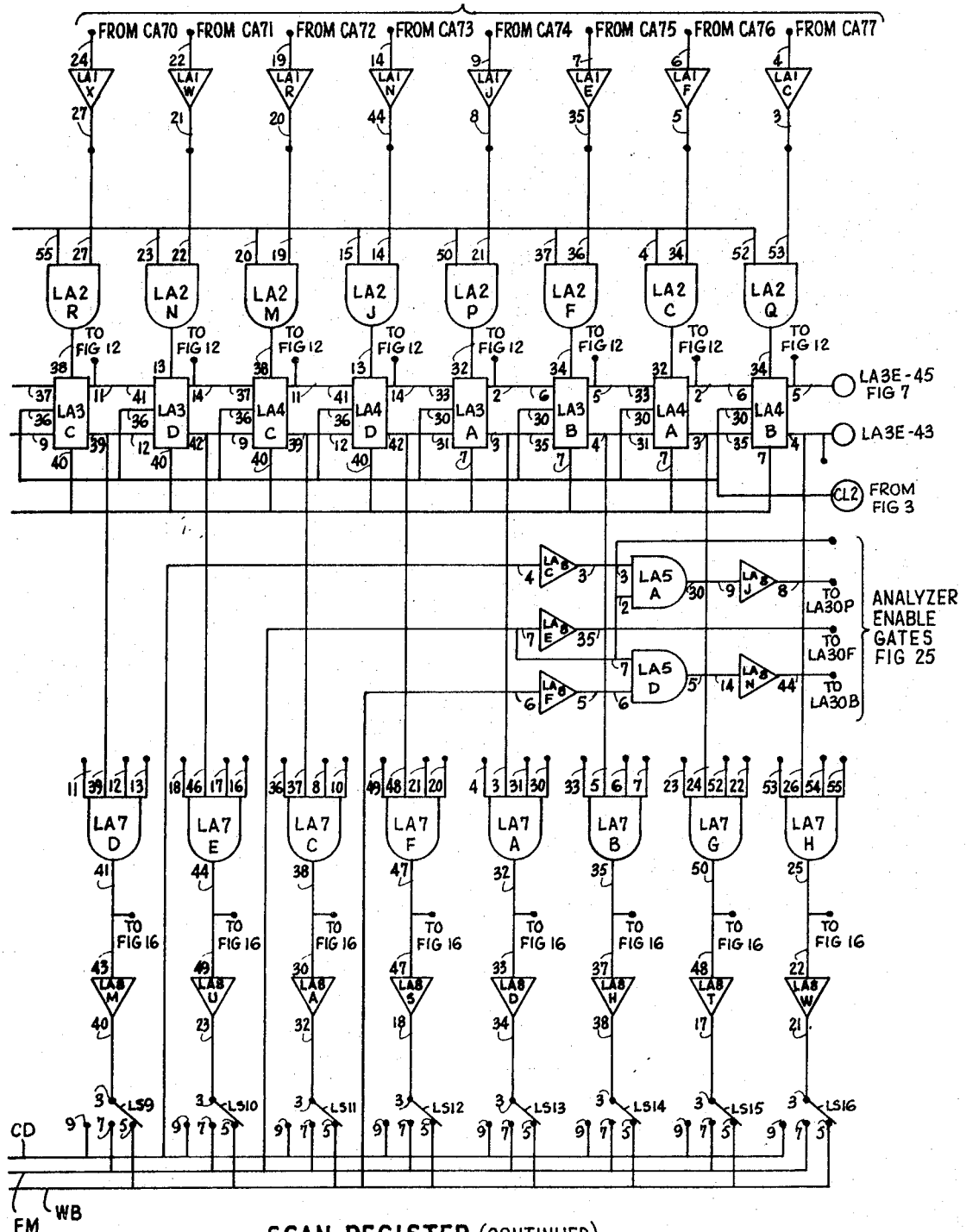
Figure 12:
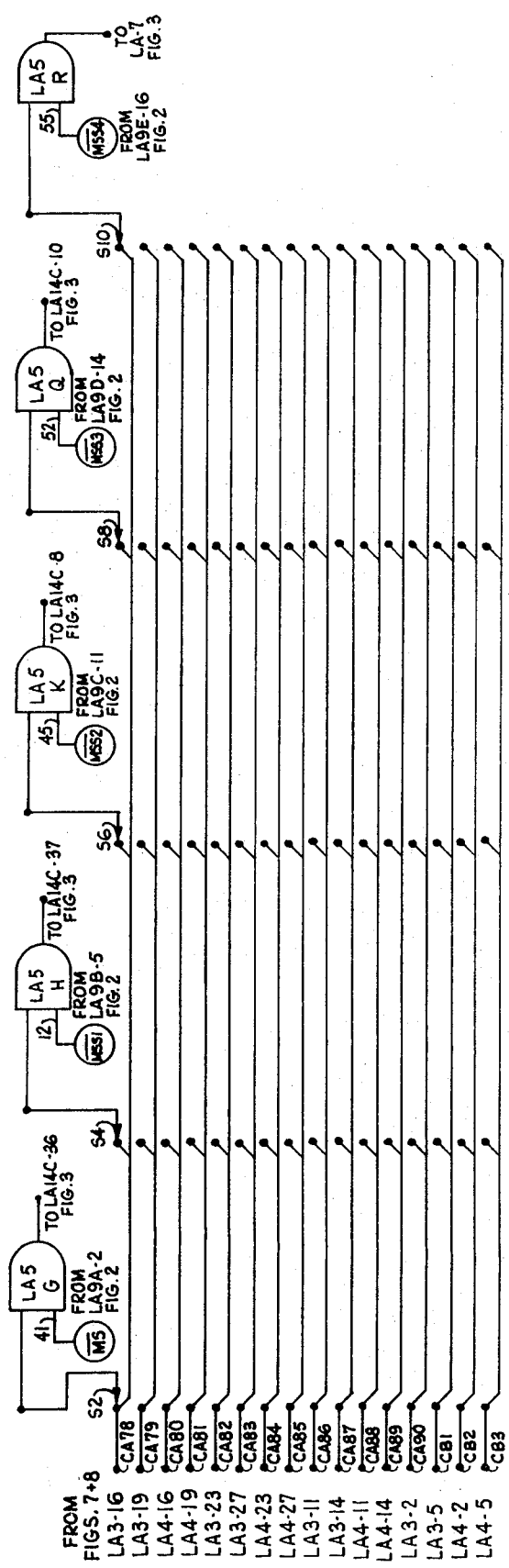
Figure 13:
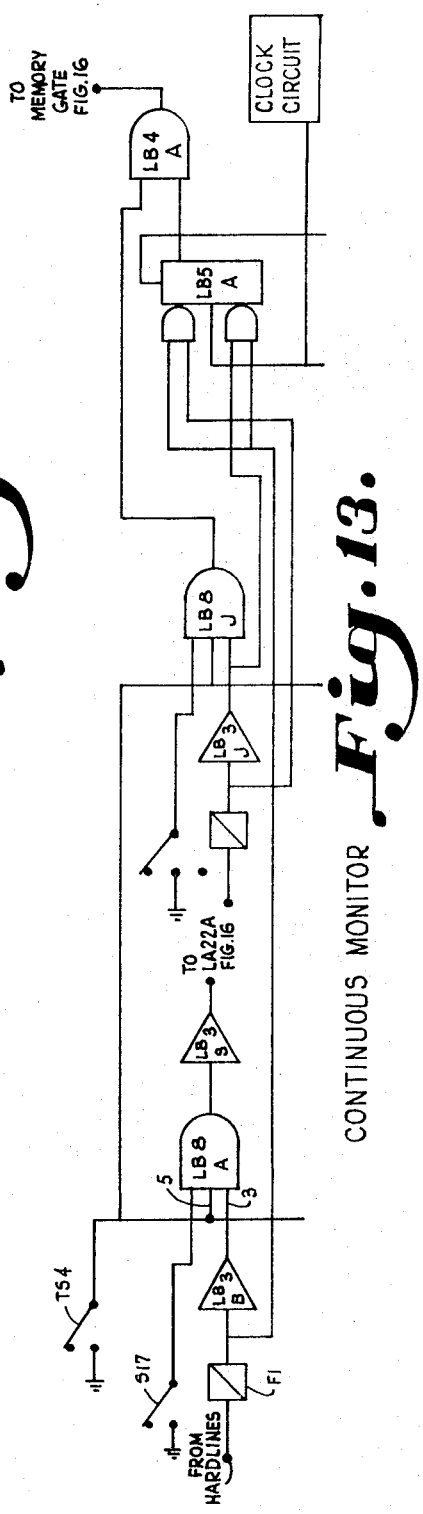
Figure 14:
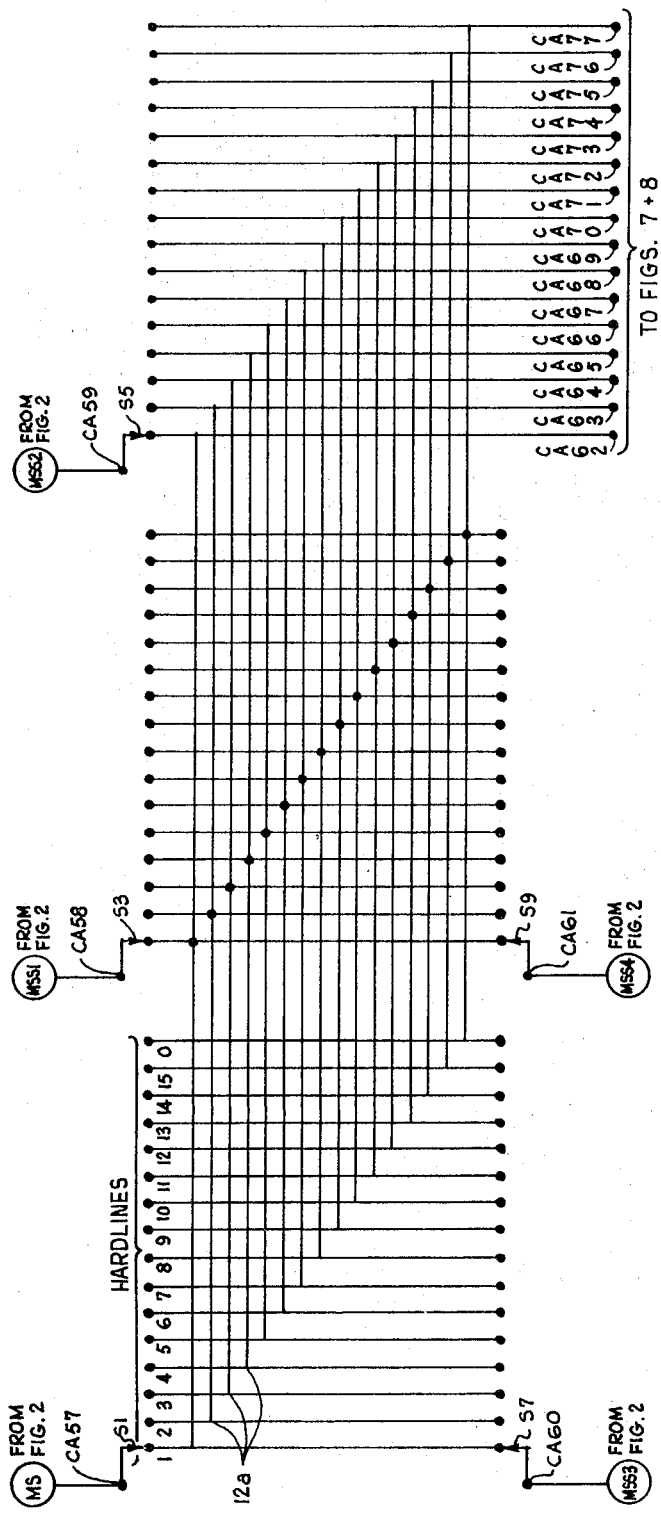
Figure 15:
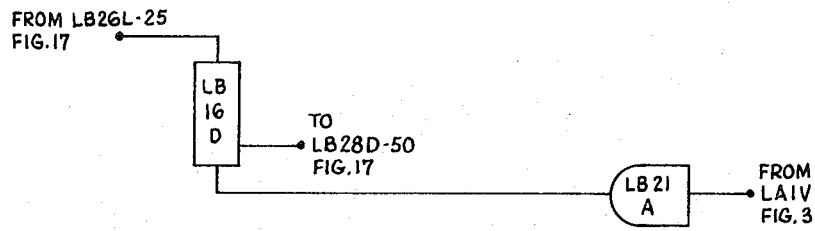
Figure 16:
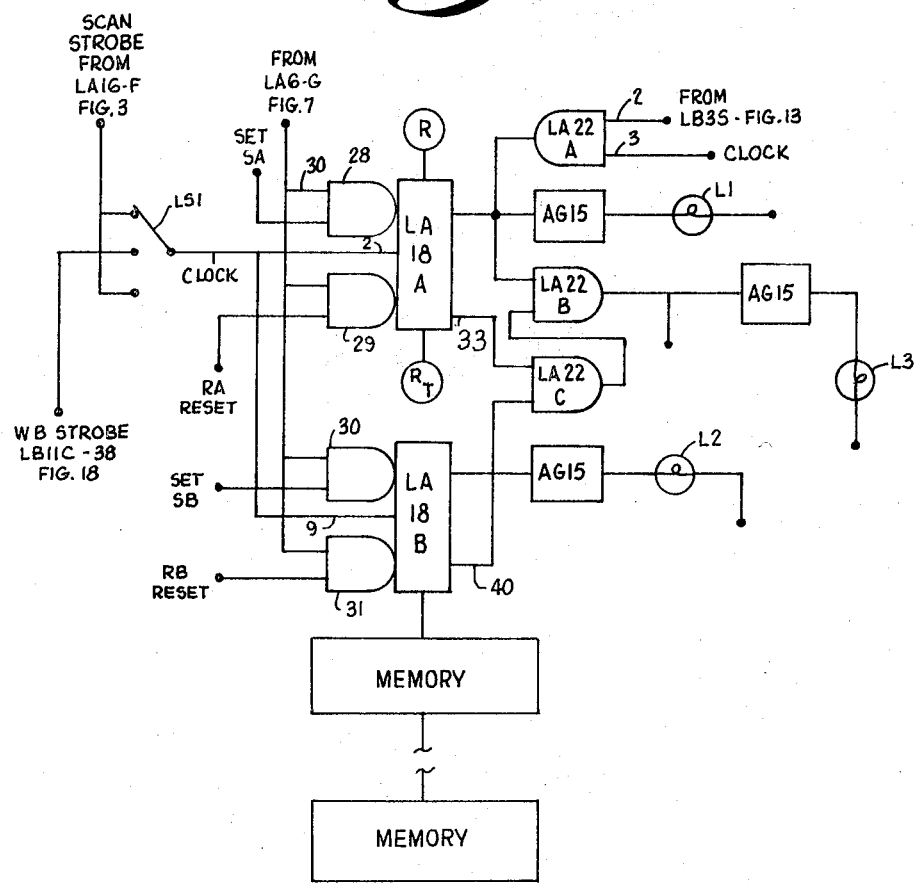
Figure 17:
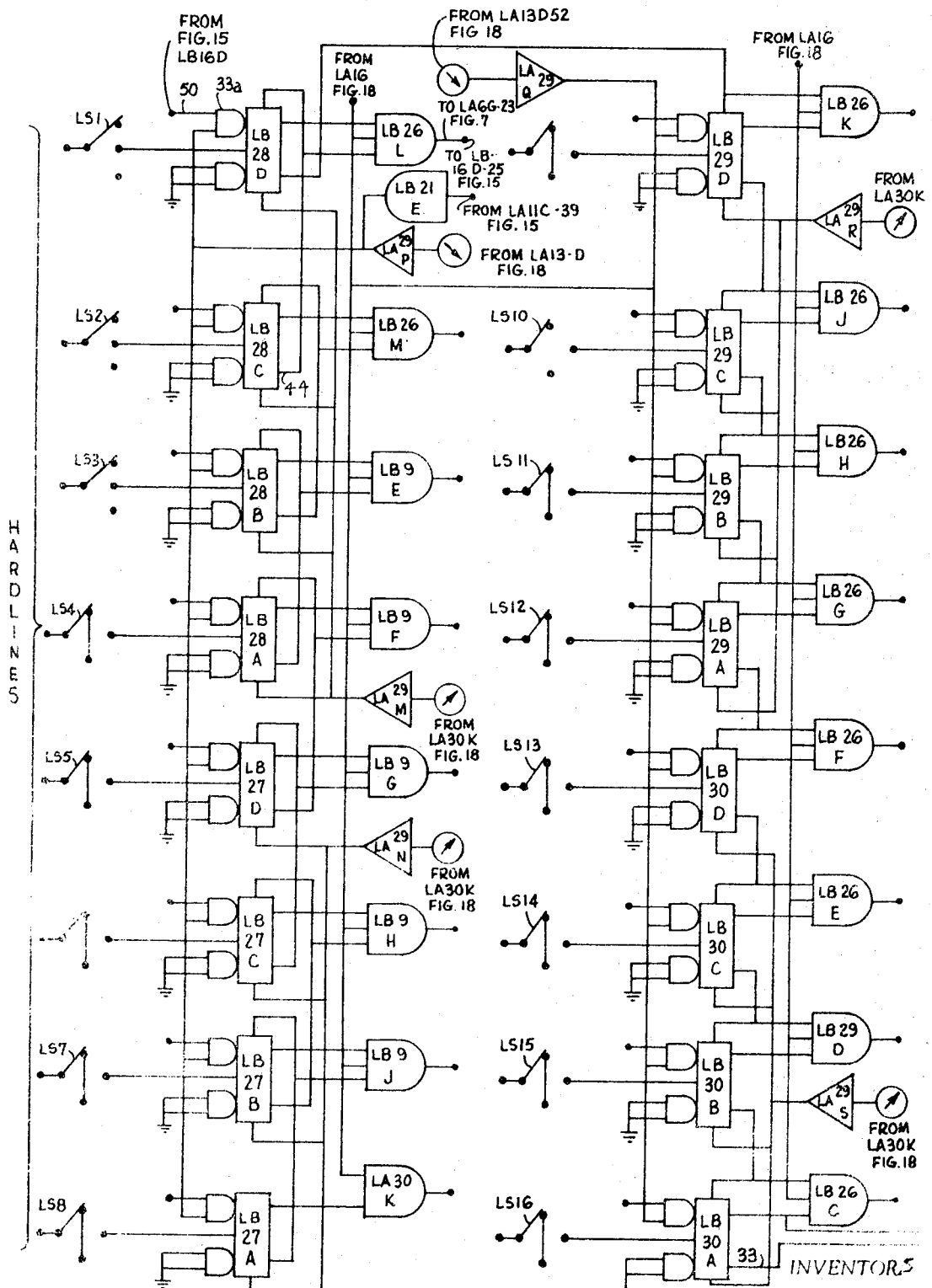
Figure 18:
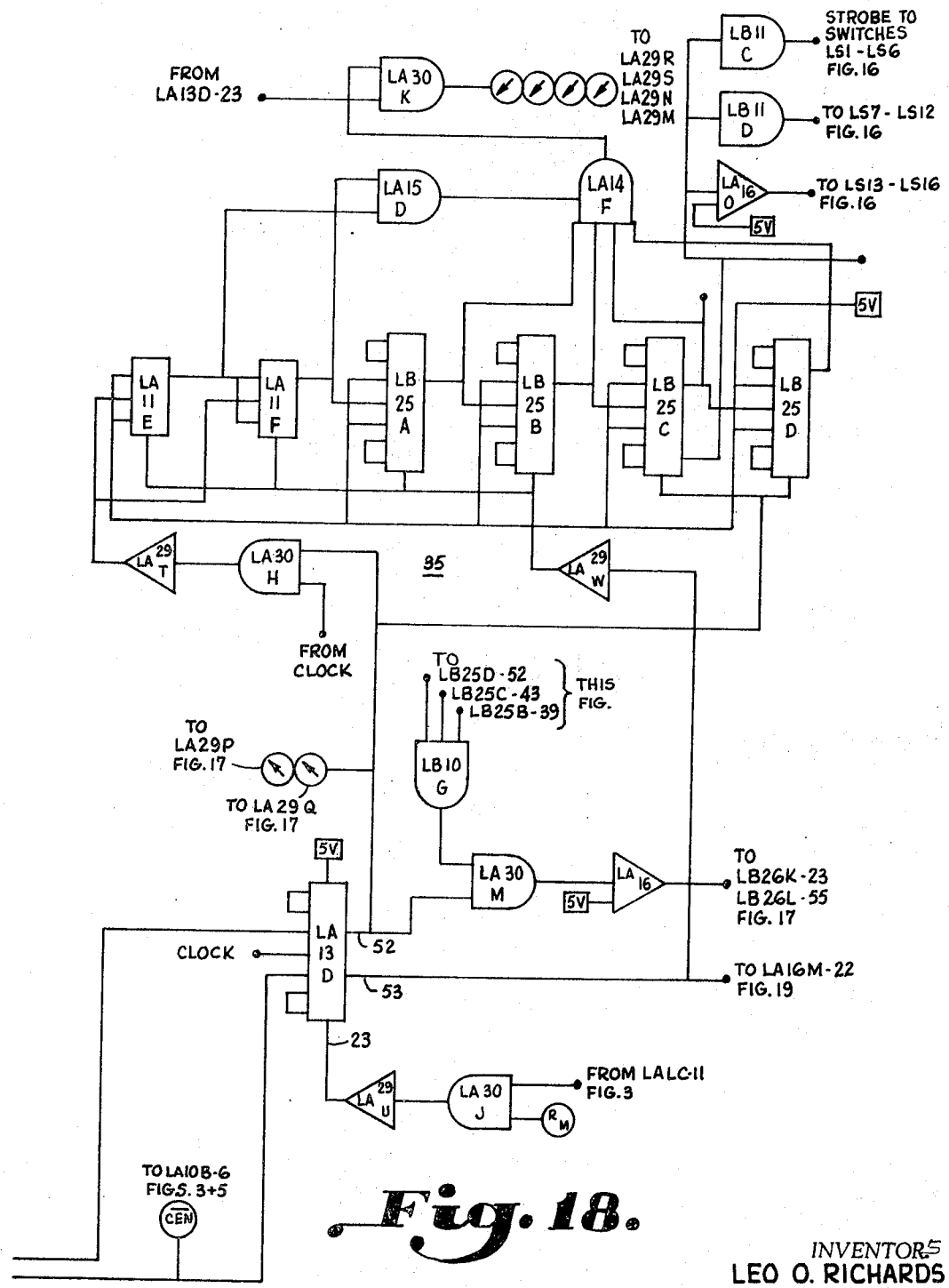
Figure 19:
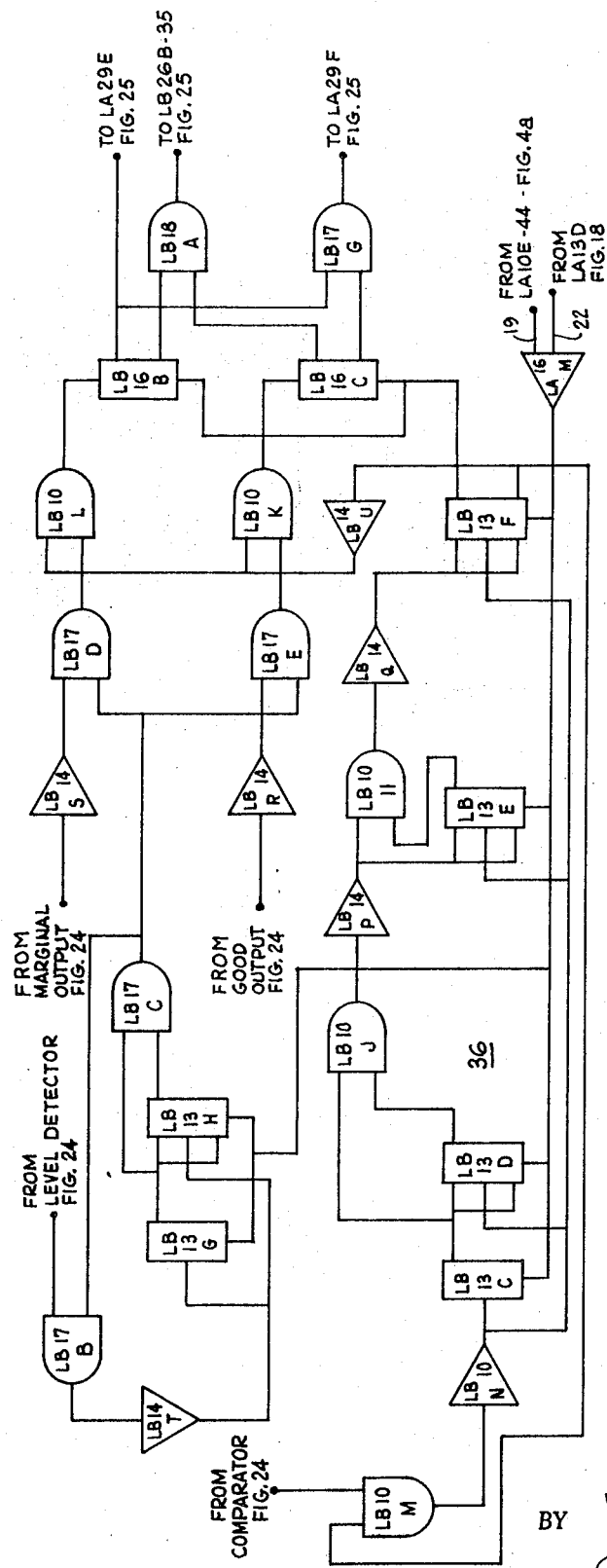
Figure 22:
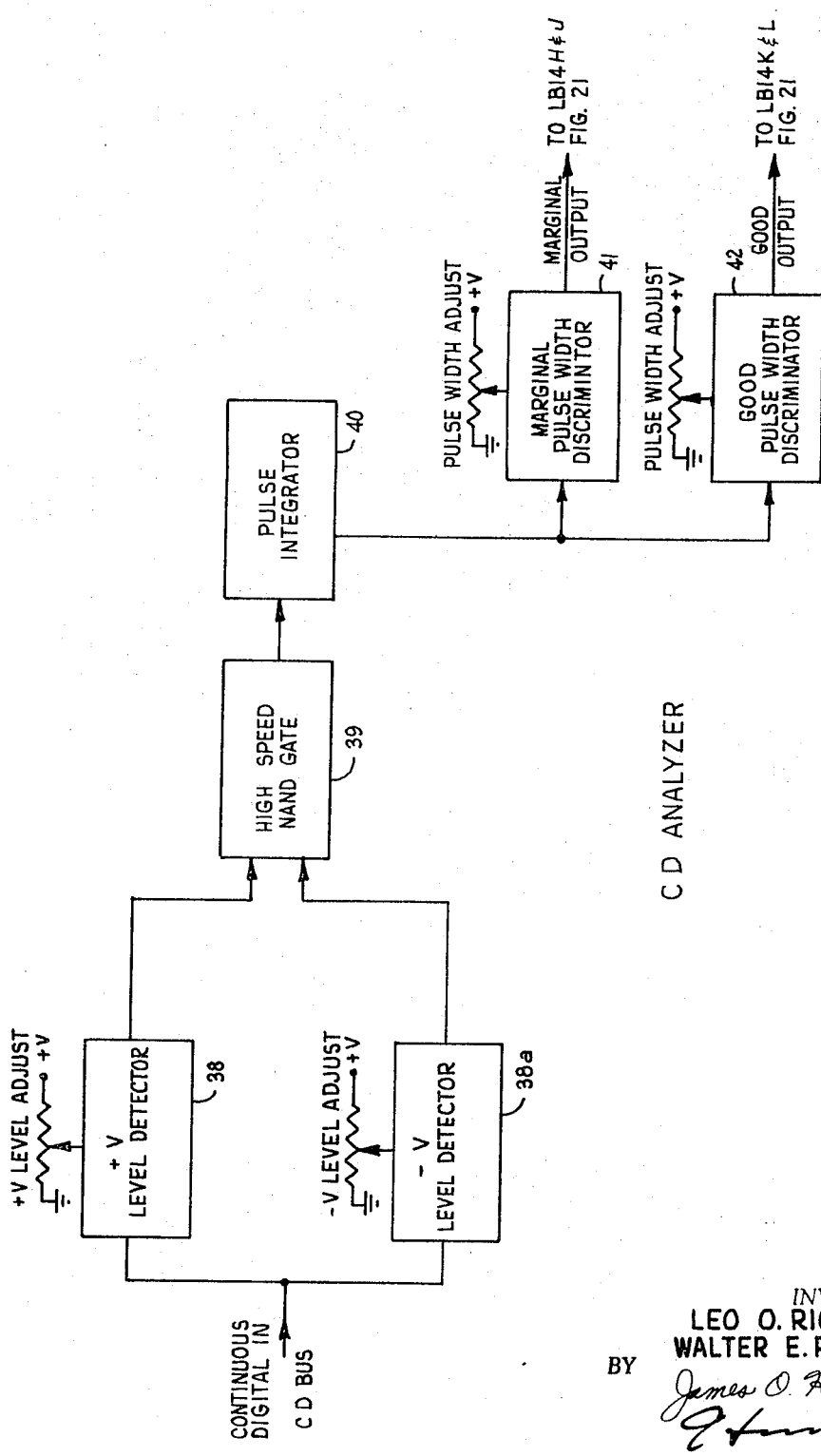
Figure 23:
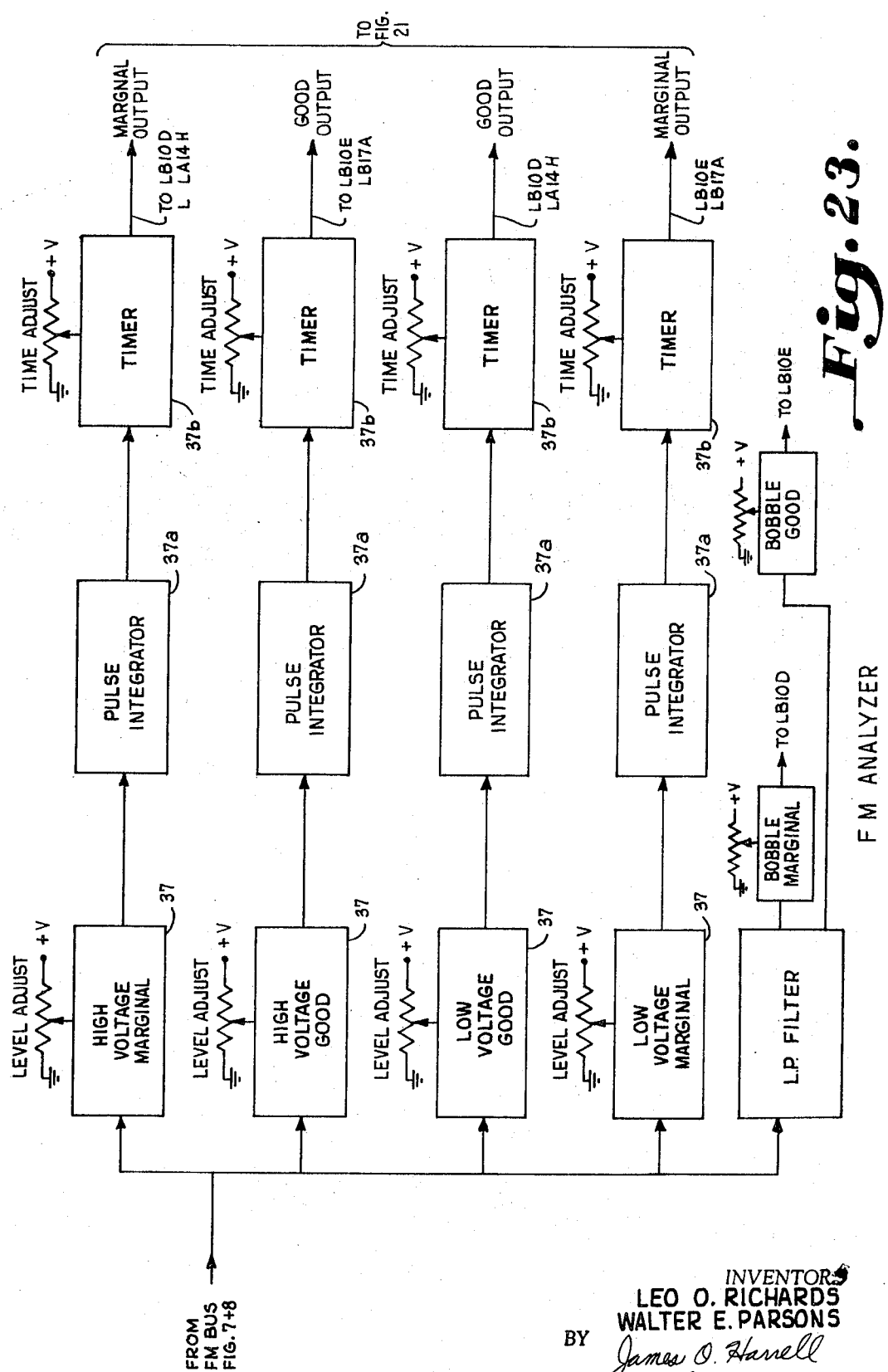
Figure 24:
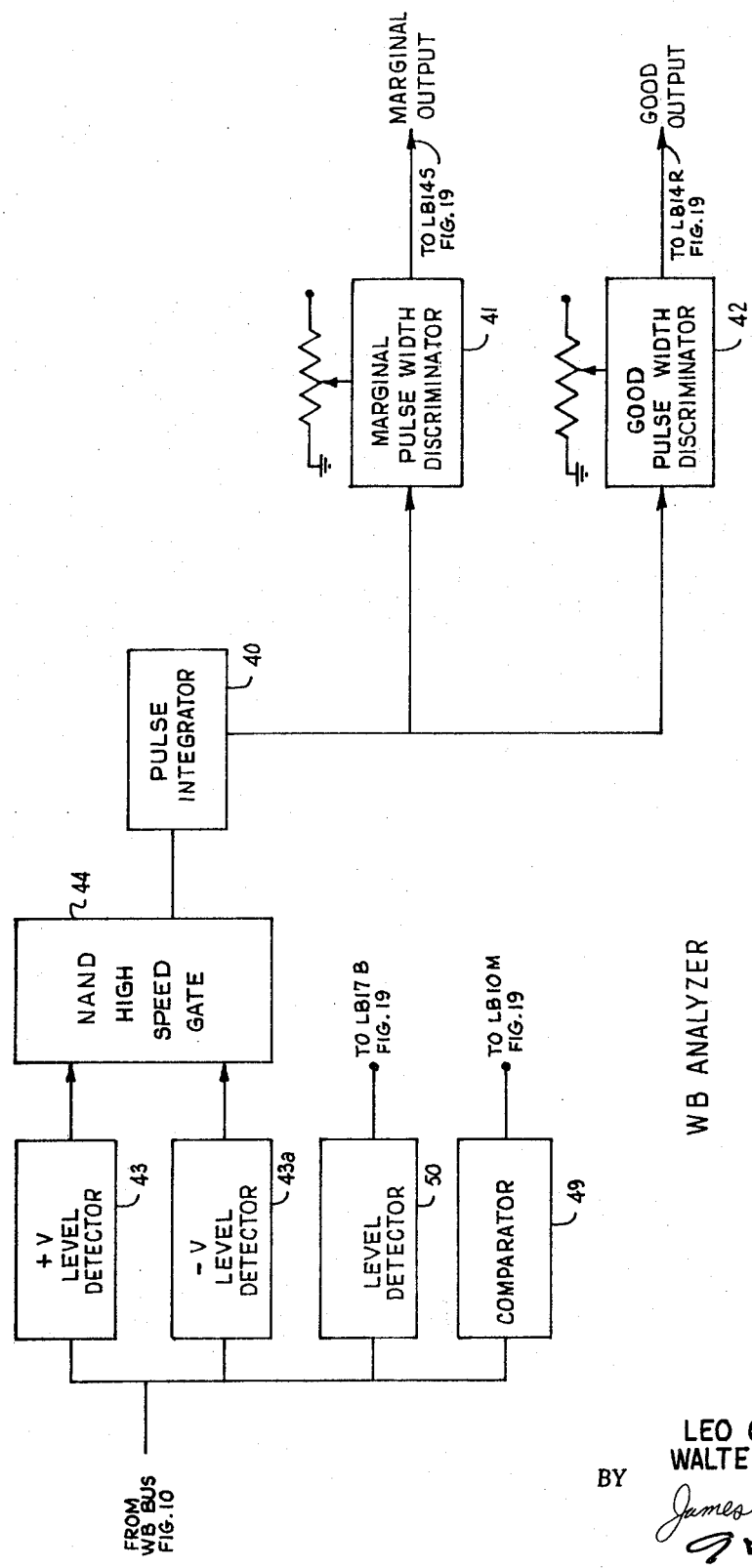
Figure 25:
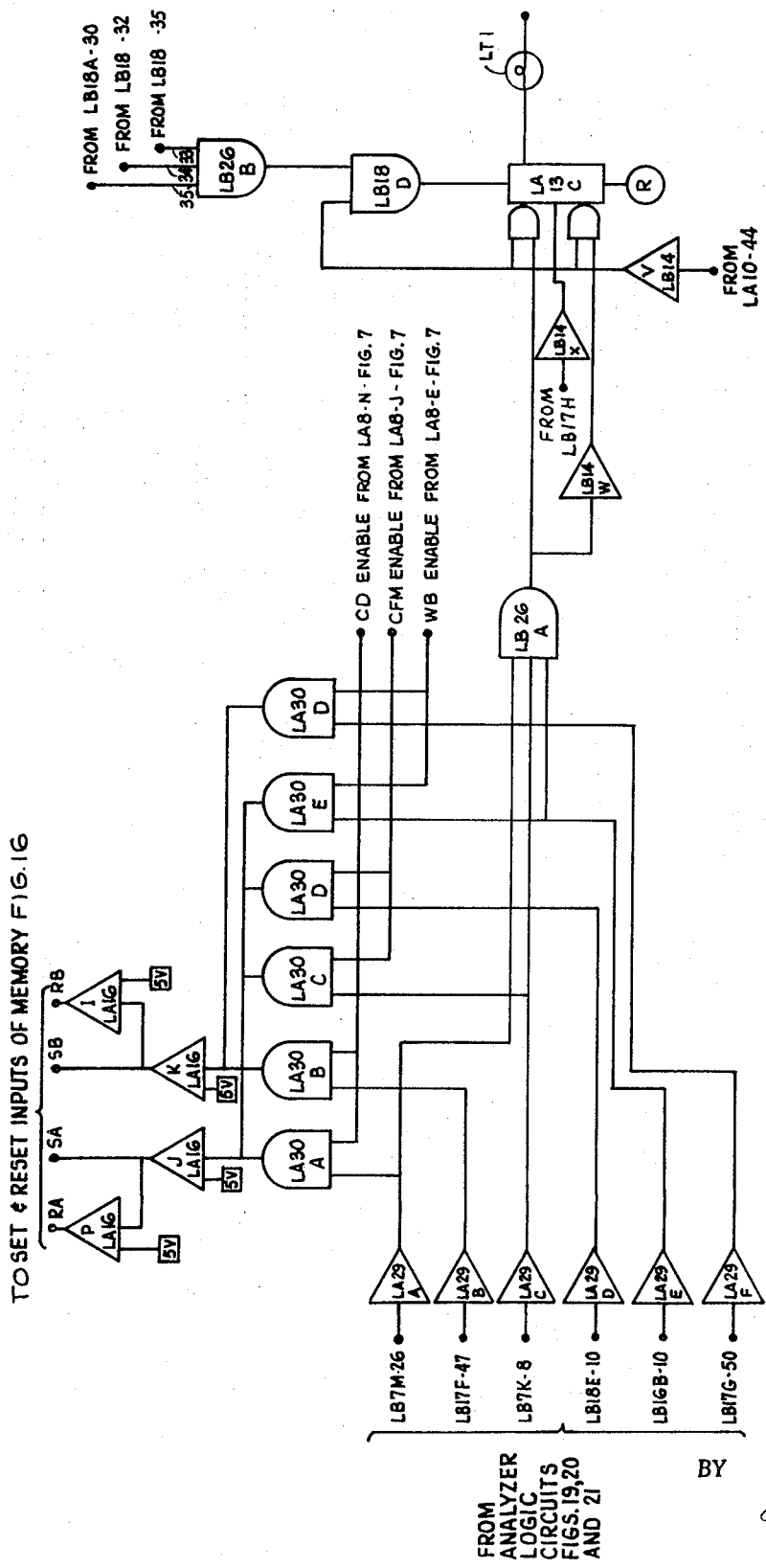
Figure 26:
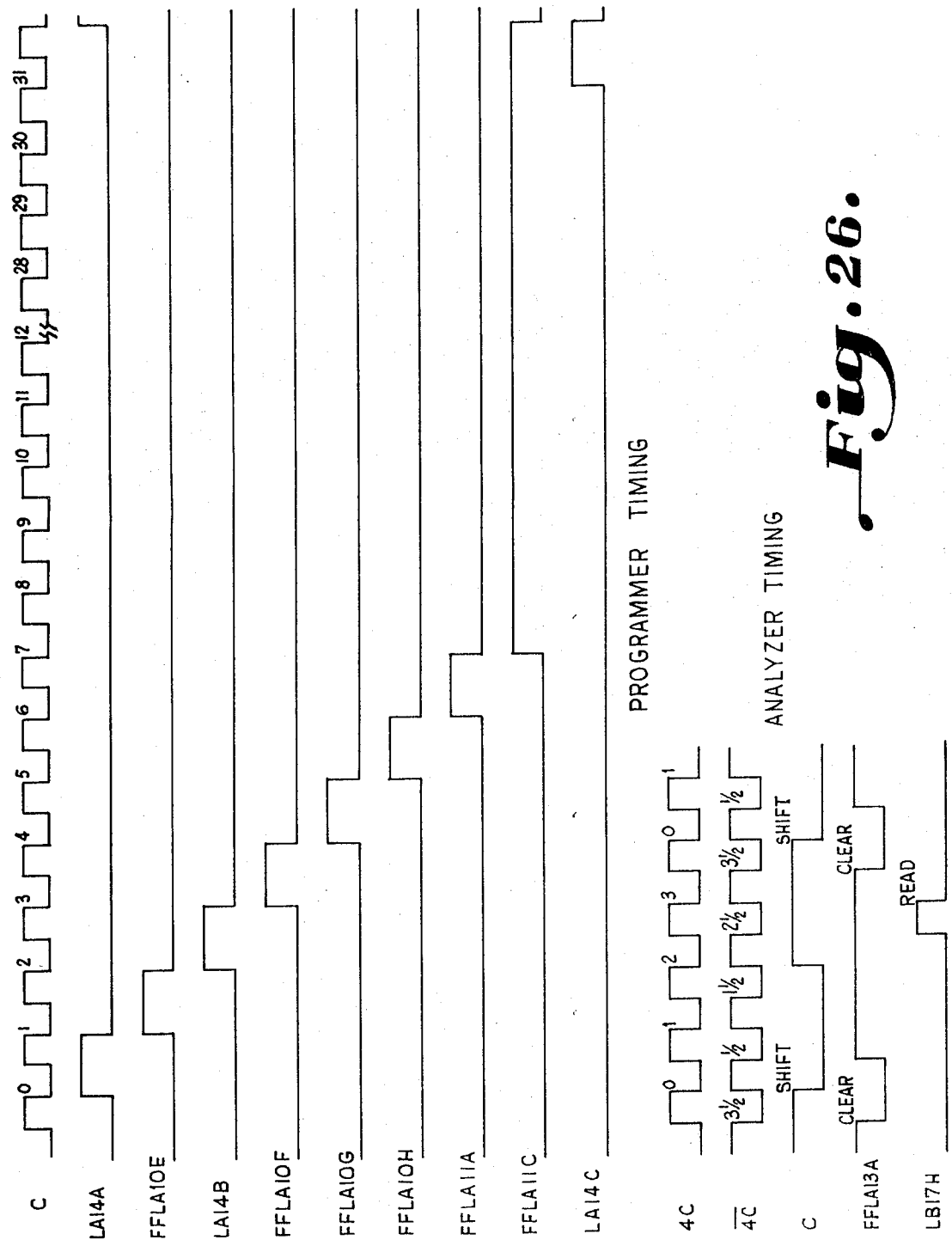

Other objects and advantages of this invention will become more apparent from a reading of the following detailed description and appended claims, taken in conjunction with the accompanying drawings wherein:

FIG. 1 is a schematic diagram showing in block form the hardline monitoring system monitoring a plurality of hardlines connecting a checkout system to a space vehicle, FIGS. 2 and 3, when placed side by side, is a schematic diagram illustrating the programmer, FIG. 4 is a schematic diagram of the phase timing clock illustrated in FIG. 3, FIG. 4A is a schematic diagram illustrating a self-test circuit of FIG. 3, FIG. 5 is a schematic diagram illustrating in detail the analyzer timing clock counter of FIG. 3, FIG. 6 is a schematic diagram illustrating in detail the check phase shift register of FIG. 3, FIGS. 7 and 8, when placed side by side, illustrate schematically the scanner or scan register, FIG. 9 is a schematic representation of the random scan register and patchboard, FIG. 10 illustrates schematically the analyzer busses, FIG. 11 is a schematic illustration of the random scan circuitry, FIG. 12 is a schematic diagram illustrating the switches for stopping the scanning, FIG. 13 illustrates two stages of continuous data monitor circuit, FIG. 14 illustrates the sequential mode thumbwheel switches, FIG. 15 illustrates the wordburst cycle timer, FIG. 16 illustrates schematically one stage of a 16 stage memory unit, FIGS. 17 and 18, when placed side by side, illustrate schematically the wordburst monitor, FIG. 19 illustrates schematically the wordburst analyzer logic circuit, FIG. 20 illustrates schematically a gating circuit which cooperates with the analyzers, FIG. 21 illustrates FM and CD analyzer logic circuits, FIG. 22 illustrates in block form a continuous digital analyzer, FIG. 23 illustrates in block form an FM analyzer, FIG. 24 illustrates in block form the wordburst analyzer, FIG. 25 illustrates schematically a gating circuit associated with the analyzers, and FIG. 26 illustrates schematically the output signals of certain components and their relationship to each other.

Referring in more detail to FIG. 1 of the drawings, there is illustrated a block diagram of the hardline monitoring system. Normally, prior to launching a space vehicle, such as illustrated at 10, there are numerous tests which have to be made in order to check the vehicle out properly. These tests are controlled by a system 11 which includes a computer. Signals are sent from the checkout system over hardlines 12 to various components of the space vehicles for directing commands, such as closing relays, taking measurements and returning information to the checkout system 11. If for some reason, the characteristics of the hardlines 12 vary, such could adversely effect the information being transmitted back and forth from the checkout system to the vehicle. Thus, it is essential at all times to know the effect that the characteristics of the hardlines 12 will have on signals that are being transmitted thereover, or can be transmitted thereover. This is accomplished by use of the hardline monitoring system constructed in accordance with the present invention. In particular, hardline monitoring system monitors the cables 12 so as to determine if such will accurately pass FM (frequency modulated), CD (continuous data), and WB (wordburst) wave forms. While the system illustrated in the drawings is only shown to accommodate or monitor 16 lines, it is to be understood that it can be readily modified to accommodate any number of lines.

The hardline monitoring system includes an electronic scanner 13 which is coupled to a programmer 14 which is in essence the heart of the system. Coupled to the programmer is a display control panel 15, a signal generator 16, an analyzer 17, and a computer interface unit 18. The computer illustrated in the box 11 is a conventional well-known computer that is presently being used in checkout systems. The computer interface unit 18 can be any suitable unit that permits compatibility between the well-known computer 11 and the hardline monitoring system.

The electronic scanner scans each of the lines 12 connected between the checkout system and the space vehicle without degrading the quality of service on the circuits or any other circuit which is connected to the system. This is accomplished by incorporating very high input impedences, and by maintaining stringent RFI requirements in the system designed. All of the scanning cycles are controlled by the programmer 14. In addition to a major scan cycle wherein all of the hardlines 12 are scanned sequentially, the programmer can be programmed for omitting lines from the scanned cycles so as to create minor scanned cycles.

All of the lines 12 are continuously monitored for traffic with the following sampling priorities controlling any scanned cycles: (1) wordburst data, (2) continuous digital data, and (3) analogue data-FM.

The presence of traffic on a higher priority circuit causes the scanner to immediately scan the priority lines and then return to the line last monitored. This shows that all selected lines are monitored at least once during a cycle. Initiation of any minor scanning cycle can be accomplished either by computer command or by manual select from control panel 15. In the automatic mode the major scan cycle runs continuously. If a command is received by the programmer from a minor scan cycle the scanner 13 will immediately proceed into the selected minor cycle. At the end of that cycle, the system stops scanning until commanded into a new cycle. If after a predetermined period no command has been received, the system automatically proceeds into the major scanned cycle.

During each scan cycle the programmer 14 sequentially connects the analyzer equipment carried in the analyzer 17 to each line being monitored. The analyzer equipment measures the total signal-to-noise ratio or digital distortion of signals on each hardline 12 and presents this information in analogue form to the programmer 14. The programmer then compares this data to previously selected specifications for the type of data traffic passing over the circuit. The programmer then determines the condition of the line underscanned by one of the following decision levels: (a) line within specification, (b) line marginal, generation of random errors probable, (c) line out of tolerance, expect constant error during transmission, (d) line out, either open or improperly patched. The degraded performance status of each line is presented to the display and control panel 15 as each circuit is being monitored. Also, decision data is provided to the computer carried within the box 11 for all lines not completely within specification. The computer interface unit 18 which is under control of the programmer provides the following information: (a) status and identification of all lines, (b) status of the monitoring system, (c) identification monitor system operational mode, (d) storage for the degraded performance of the line, and (e) automatic restoration of the lines under computer control.

The programmer 14 is the heart of the invention and gates the signal from the signal generator 16 to the hardlines 12, as well as controls the operation of the scanner 13. It also gates signals from the hardlines 12 to the analyzer 17 to be analyzed. After the signals have been analyzed the programmer gates information to the display and control panel 15, as well as to the computer indicating whether the condition of the lines being monitored is good, marginal or bad in the form of a green, yellow or red light.

There are also priority control circuits which interrupt the scanner 13 any time a wordburst signal appears on one of the hardlines 12 and causes the scanner to go to that line. For example, if the hardline referred to as No. 8 has a wordburst signal thereon, the scanner immediately leaves the line that it is presently scanning and goes to line 8 so that the analyzer 17 can analyze the wordburst signal thereon. After the analyzer 17 has analyzed the signal the computer and control display panel is forwarded a signal indicating the results of such analysis. The electronic scanner 13 then returns to the hardline 12 which was scanning prior to the interruption.

The signal generator 16 is under control of the display and control panel 15 for testing spare lines or operational lines during periods of quiescence. The signal generator 16 produces FM, CD and WB signals identical to those being transmitted normally over the hardlines for testing the characteristics of the lines.

The display and control panel 15 functions directly through the programmer 14 and provides operational and maintenance personnel with the necessary indicators and controls for the operation of the monitoring system.

The computer interface 18 can be any suitable conventional interface unit and operates as normal computer peripheral and provides for two-way communication between the monitoring system and the computer complex 11.

Referring in more detail to the drawings, FIGS. 2 and 3 illustrate in detail the programmer 14. The programmer consists of a mode register, which includes nine pushbuttons PB1 through PB9 for manual selection of the mode, and a phase timing clock 19 which sets definite time slots for the execution of each phase of operation, and can be used to control a test phase (not disclosed), check phase (not disclosed), and mode phase.

The mode register consists of flip-flops LA9A through LA9H and LA10A; the mode register reset flip-flop LA12D; "OR" gate LA15A; "AND" gate LA5B; inverters LA1P, Q, S, T and U; and buffer amplifier LB11A.

Each of the flip-flops LA9A through LA9H and LA10A have a DC set input line (refer to LA9A) at the top 32 which is connected to one of the pushbuttons PB1 through PB9. The next input 33 is coupled directly to ground to place a ground voltage thereon. The next input 30 is coupled to a 4C clock pulse of 40 cycles. The bottom input 31 is a reset input for the flip-flop. The output 7 is connected through a pushbutton 21 to the computer interface. Output 3 is connected to the lamp 22 located on the control panel 15. Output lead 2 is also connected to a lamp 23 through an amplifier 24. Output lead 2 also produces a mode signal MS as indicated by the circled legend through an inverter LA1P. Also, connected to the output lead 2 are the switches LA5G, LA5H, LA5K, LA5Q and LA5R (FIG. 12) as indicated in the drawings. The connections between various components are as illustrated and labeled in the drawings.

Each of the switches PB1 through PB9 is coupled to a suitable DC source through switch 25 which is, in turn, coupled to the corresponding point 25 at the output of the mode phase flip-flop LA11A-2 (FIG. 3).

The mode register stores the desired mode of operation at a set level output on any one of the flip-flops LA9A through LA9H or LA10A. The circuit is so designed that only one mode may be set in at any time by operation of pushbuttons PB1 through PB9. The operation is as follows: For example, say one flip-flop is set; the pushbuttons are all in the normally closed position. Flip-flop LA12D which is connected to the output of OR gate LA15A, is reset by voltage level ST coming from flip-flop LA11A of the mode phase register which is always logical "0," except when a strobe is present at the input to flip-flop LA11A. OR gate LA15A is disabled since all the inputs are floating (logical one). AND gate LA5B is thus disabled by the output of OR gate LA15A. The output of LA5B through amplifier LB11A is thus "0" and the reset levels to flip-flops LA9A through LA9H and LA10A are not enabled, thus the present mode is retained.

When one of the pushbuttons PB1 through PB9 is operated a "1" is given to the input of the chosen flip-flop and to one leg of OR gate LA15A. Should two pushbuttons be pushed simultaneously, the higher number will take precedence because the operation of any button breaks the enabling level (ST) to those below it (numerically). This will happen unless ST should be high, indicating a strobe is taking place, and it is not possible to change modes at this time. The output of LA15A goes to a "1," enabling LA5B which presents a "1" to all the reset inputs of flip-flops LA9A through LA9H and LA10A. LA15A also enables the set level of flip-flop LA12D which is now not being held reset due to the interruption of ST by the depressed pushbutton. On the next 4C clock pulse flip-flops LA9A through LA9H, and LA10A are reset except for the one being held set. Thus, the old mode choice is reset and the new set into the register. On the next C clock pulse which is coupled to the input 49 of the flip-flop LA12D, such is set, disabling LA5B through the output 53 and the input to LA5B33, removing the reset level to flip-flops LA9A through LA9H, and LA10A. That reset of course, comes through amplifier LB11A. The pushbutton which was depressed is now released and flip-flop LA12D is reset when the normally closed position is reached. The new mode is now stored.

As illustrated, each of the flip-flops LA9A through LA9H, and LA10A has a corresponding input 18a to the DC set point from the computer interface so that the computer can take over the operation if desired, rather than manually depressing the push buttons PB1 through PB9.

Any time there is an output on the output leads on the flip-flops LA9A through LA9H, and LA10A a lamp 22 or 23 is illuminated, indicating the state in which the flip-flop is in. These lamps are physically positioned in the control and display panel 15. As labeled, each of the flip-flops LA9A through LA9H and LA10A has an output; for example, MSS1 which is connected to the sequential mode thumbwheel switches of FIG. 12 for controlling the scanning. The thumbwheel switches which will be discussed in more detail later, are set up for controlling the stop and start scanning sequences of a particular mode.

The phase timing clock 19 is provided for aiding in synchronizing the operation of the various components of the hardline monitoring system. It insures that the system regularly cycles through a self-test phase (not disclosed) and a check of those lines which are to be regularly tested. The phase timing clock 19 establishes a definite time fro each phase. The phase counter cycles from states 00000 to 11111 and return. It also sends a timing signal and AND gate LA14, which is, in turn, coupled through AND gate LA14C to the mode phase register 20. The phase counter 19 is a 5-bit counter which times the operation of the program. The timing clock 19 consists of flip-flops LA10C, D and LA12A through C, which are connected as a ripple counter; AND gates LA14A, LA14B, and LA14E. The phase counter cycles from states 00000 to 11111 and returns. LA14A is enabled at 00000; LA14B at 01000; and LA14E at 11111.

The phase flip-flops are the flip-flops which control the operation of the system. They consist of flip-flop LA10E (FIG. 4A) which enables the test phase; flip-flops LA10F, G, and H (FIG. 6) which are connected as a three-bit shift register, and control the check phase; and flip-flops LA11A, LA11B, and LA11C (FIG. 3) which control the mode phase. The operation of these flip-flops is as follows: (See FIGS. 3, 4, 4A and 5) The phase timing clock 19 starts in state 00000, wherein all phase flip-flops (FIG. 3) LA10C, LA10D, LA12C, LA12A and LA12B are reset. At 00000 LA14A is enabled so that on the next C clock pulse Flip-flop LA10E which forms part of the self-test circuit (not shown) is set, and the system is now in the self-test phase. The next clock resets flip-flop LA10E and the phase is terminated. At 01000 flip-flop LA14B is enabled and the next clock shifts a "1" into flip-flop LA10F. The output flip-flop LA10F selects one of the channels via the patchboard PBd illustrated in FIG. 9. The next two clock pulses shift the "1" to flip-flop LA10G and flip-flop LA10H so that three channels are selected. The next pulse shifts the "1" into flip-flops LA11A and LA11B (FIG. 3) ending the check phase and beginning the mode phase.

When flip-flop LA11A is set the strobe level ST goes positive and the content of the mode register is strobed into the scan register via the sequential mode thumbwheel switches (FIG. 14). The next clock resets flip-flop LA11A ending the strobe and sets flip-flop LA11C. When flip-flop LA11C is set the C clock is enabled through gate LA5E to the clock lines of the scan register via buffers LA16G and LA16H. Flip-flop LA11C and flip-flop LA11B remains set until OR gate LA14C is enabled by an input from a stop selection of a scan cycle thumbwheel switch (FIG. 12) or the phase timing clock in state 11111 which enables LA14E to originate. The counter recycles to the 00000 state and the process begins again. The outputs of the flip-flops LA10C, LA10D, LA12C, LA12A and LA12B are coupled to the gates LA14, LA14A, LA14B, LA15, as illustrated, and a 5-volt voltage is applied to each of the respective flip-flops. A reset signal R is applied to each of the flip-flops LA10C, LA10D, LA12C, LA12A, LA12B, from the output of flip-flop LA11C of the mode phase register. Another reset signal RM comes from flip-flop LA11B of the mode phase register and is applied to AND gate LA14. The clock pulse 4C is applied to the center input terminal of flip-flop LA10C, as labeled, for controlling the phase timing clock 19. Actually, the 40-cycle input signal which is referred to as 4C coming into LA10C and LA10D is divided by 2 by flip-flop LA10C and divided by 4 by flip-flop LA10D. The output signals of these flip-flops are, in turn, supplied and AND gates LA14 and LA14A for producing the timing signal illustrated in FIG. 22 for the test phase which is not disclosed. Any suitable conventional phase timing clock could be used which produced the timing signals illustrated in FIG. 26 of the drawings. The relationship of the clock pulses are as illustrated in FIG. 26.

The analyzer timing clock counter 27 (FIGS. 3 & 5) consists of flip-flops LA10B, LA13B, and LA13A along with AND gates LA5C and LB17H. The basic clock is 40Hz, 4C, which is counted down by flip-flops LA10B and LA13B. The alpha transition of the flip-flop LA13B is the 10 Hz clock C. The analyzer timing is done by flip-flop LA13A, LA5C, and LB17H. When the clock counter is at count 10 and 4C is positive, AND gate LB17H is enabled and the alpha transition is sent to the indicator register memory (FIG. 16) via buffers LA16B, E, L and F. At count 11, LA5C is enabled and when $\overline{4C}$ goes through an alpha transition flip-flop LA13A is set through LA5C and LA1Z, clearing the analyzers. C then occurs and flip-flop LA13A is reset to 0 and the $\overline{4C}$ alpha transition. In this way the analyzers are read by the scan strobe; cleared by flip-flop LA13A; the scan register is shifted by C, and the analyzers are enabled at 0 plus the 4C alpha delay. The $\overline{CEN}$ applied to flip-flops LA10B and LA13B comes from the wordburst monitor illustrated in FIG. 18 and sets the flip-flops to the proper state so that the 4C input signal being applied thereto can step the flip-flops properly.

SCAN REGISTER

The scan register (FIGS. 7 and 8) includes a 16-bit ring counter made up of flip-flops LA3A through LA3H and LA4A through LA4H, together with input strobe AND gates LA2A through LA2R, and output OR gates LA6A through LA6H and LA7A through LA7H. Other circuitry includes input inverters LA1A through LA1N, LA1R, LA1W and LA1X; output inverters LA8A, B, D, G, H, K, L, M. P, Q, S, t, u, v, w and x; random scan AND gates LA5N, M, J and P; and analyzer enable gates LA5A and LA5D with inverters LA8C, E, F, J and N. The scan register selects the hardline 12 to be switched in order to be analyzed by the analyzer 17 whenever the system is in a scan cycle, either directly through the output gates or indirectly through the patchboard (FIG. 9) which comes in the right-hand input terminal of the output gates LA6A through LA6H and LA7A through LA7H, as indicated by the legends in FIG. 9. There are corresponding connections for each of the output gates and only the particular connection for the OR gate LA6G is described now. Connected to input terminal 52 is the thumbwheel switch S1 illustrated in FIG. 14. Connected to input terminal 24 is the output of random scan gate LA5N. Connected to input terminal 23 is a signal from the wordburst monitor illustrated in FIG. 17 and, in particular, from gate LB26L output terminal 25 (FIG. 17). Connected to output terminal 22 is the patchboard, as illustrated in FIG. 9. The other OR gates LA6B through LA6F and LA7A through LA7F service the corresponding inputs from corresponding gates including the thumbwheel switches, the wordburst monitor, and the patchboard as indicated in the drawings.

All of these signals are under control of the various scanning cycles described above in connection with the programmer and the other components subsequently described.

MAJOR SEQUENTIAL AND MINOR SEQUENTIAL MODES

The starting place for any of the sequential modes is selected on each of five thumbwheel switches S1, S3, S5, S7 or S9 of FIG. 14. Corresponding positions on the thumbwheel switches are connected together in the form of a matrix, and inputs to the switches are from the outputs of the five sequential mode flip-flops in the mode register, Flip-flops LA9A through LA9E through inverters LA1P through LA1U. These connections are appropriately labeled in the drawings in FIG. 14 entitled sequential modes thumbwheel switches, and in the mode register (FIG. 2). If any of the flip-flops LA9A through LA9E and the mode register is set, the corresponding thumbwheel switch S1, S3, etc. is level-enabled, and the selected position is enabled through the switch. It is to be understood that each of the 16 hardlines 12 illustrated in FIG. 1 are also connected to the common junctions 12a of the thumbwheel switch in order to get the information from the hardline 12 to the thumbwheel switches.

When the strobe pulse ST coming from the mode phase flip-flop LA11A (FIG. 3) goes high the selected hardline strobes a "1" into the corresponding flip-flop (forming the ring counter) of the scan register. The scan register is cleared when the "1" is shifted into the stage of the desired stopping hardline. The stopping hardline is selected on each of five thumbwheel switches S2, S4, S6, S8 or S10 (FIG. 12) which complement the five starting switches S1, S3, S5, S7 and S9 (FIG. 14). The output of each flip-flop in the scan register is connected to the corresponding output position of the switches. For example, the output terminal 16 of flip-flop LA3E is connected to input terminal CA78 of thumbwheel switch S2. The corresponding output terminals of the flip-flops forming the ring counter are connected as illustrated in FIG. 12 showing the switches for stopping the scanning. The thumbwheel switches S2, S4, etc., inputs are coupled to AND gates LA5G, H, K, Q and R, respectively. The AND gates LA5G, etc., are enabled by the output of flip-flops LA9A through LA9E in the mode register. If one of these has been set, the one that was set by the start thumbwheel S1, S3, S5, etc., will eventually be shifted down to the desired stopping hardline. At that time, the mode register enables AND gate LA5E (FIG. 3) will be enabled by the output of the stopping hardline OR gate LA14C through its corresponding thumbwheel switch S2, S4, etc. OR gate LA14C enables the reset of flip-flops LA11B and LA11C, resetting them on the next clock pulse. The associations and functions of the thumbwheel switches S1 through S10, four patchboards PBD1 through PBD4 and the pushbuttons PB1 through PB9 are as follows:

```
S1 – MAJOR SCAN START CHANNEL (PB1)
S2 – MAJOR SCAN STOP CHANNEL (PB1)
S3 – MINOR SEQUENTIAL SCAN 1 – START CHANNEL (PB2)
S4 – MINOR SEQUENTIAL SCAN 1 STOP CHANNEL (PB2)
S5 – MINOR SEQUENTIAL SCAN 2 START CHANNEL (PB3)
S6 – MINOR SEQUENTIAL SCAN 2 STOP CHANNEL (PB3)
S7 – MINOR SEQUENTIAL SCAN 3 START CHANNEL (PB4)
S8 – MINOR SEQUENTIAL SCAN 3 STOP CHANNEL (PB4)
S9 – MINOR SEQUENTIAL SCAN 4 START CHANNEL (PB5)
S10 – MINOR SEQUENTIAL SCAN 4 STOP CHANNEL (PB5)
PBD1 – MINOR RANDOM SCAN 1 (PB6)
PBD2 – MINOR RANDOM SCAN 2 (PB7)
PBD3 – MINOR RANDOM SCAN 3 (PB8)
PBD4 – MINOR RANDOM SCAN 4 (PB9)
```

MINOR RANDOM SCAN

The minor random scan is accomplished by sequentially stepping a "1" from stage one of the ring counter LA3E to stage four LA4F, blocking the outputs to the output gates with AND gates LA5N, LA5M, LA5J, and LA5P, and patching the outputs to the desired hardline output gate LA17A through LA17R (FIG. 9) via the patchboard PBD. The random scan circuitry includes OR gate LA14D (FIG. 11), AND gates LA5N, M, J, and P of the scan register (FIG. 7), AND gates LA17A through LA17R of the random scan register (FIG. 9). Whenever one of the random scan mode flip-flops LA9F through LA9H and LA10A is selected, LA14D is enabled (FIG. 11), disabling scan register gates LA5N, M, J and P through inverter LA8R. The outputs of flip-flops LA3E and F and LA4E and F of the scan register (FIG. 7) are coupled into each of four sets of scan cycle gates LA17A through LA17D, LA17E, LA17J through LA17M and LA17n through LA17R (FIG. 9). One of these sets of gates will be enabled by the output of a minor cycle flip-flop in the mode register, thus each will be enabled in turn, as the one shifts from flip-flop LA3E to flip-flop LA4F in the scan register. The outputs of the random gates LA17A through LA17R (FIG. 9) are patched into the desired scan register output OR gate LA6A through LA6H and LA7 through LA7H (FIGS. 7 and 8) by the patchboard (FIG. 9). The patchboard PBD can be any suitable conventional patchboard, and it is used with the minor random scan selection push buttons PB6 through PB10. The patchboard allows selection of any four hardlines for scanning in any sequence for each of the four minor random scan cycles. The patchboard also provides the means by which the three priority hardlines are selected. To begin the scan a "1" is entered into the scan register by the output of gate LA14D through inverter LA1M (FIG. 7) and OR gate LA5L of the scan register. The cycle is stopped when the "1" reaches stage four (flip-flop LA4F) where the output goes to gate LA5F (FIG. 11) of the random gates which is enabled by LA14D, thus enabling LA14C (FIG. 3) in the programmer, which sets up the mode phase register 20 which, in turn, sends a signal to reset all of the flip-flops LA9A through LA9H and LA10A of the mode register.

OUTPUT GATES

There are four inputs to each of the OR gates LA6A through LA6F and LA7A through LA7F (FIGS. 7 and 8), which may have an input from the scan register flip-flops of the ring counter, the random scan patchboard, the manual switch S1, S3, etc., or the priority interrupt system from the wordburst monitor. If any one or more of these is enabled, the output of the OR gates LA6A through LA6F and LA7A through LA7F is fed to the corresponding terminal entering a memory unit illustrated in FIG. 16. There is a memory unit for each of the outputs LA6A through LA6F and LA7A through LA7F gates. In other words, there are 16 memory units. The purpose of this is to illuminate a lamp on the control panel to show the status of the hardline being monitored. Of course, this signal operates with other signals from the analyzer, etc., to illuminate the appropriate lamp. The outputs of the OR gates LA6A through LA6F and LA7A through LA7F are also fed through the output inverters illustrated in FIG. 7 to an analyzer selection bus labeled CD, FM and WB corresponding to the type of data to be analyzed over that bus. Any particular hardline can be analyzed for continuous digital (CD), continuous FM (FM), or wordburst (WB) by the setting of the three positions of switches LS1 through LS16. When any hardline is selected the output of the corresponding output inverter is fed to the particular bus chosen. The output of the bus will enable the proper analyzer for the type of data (programmed by the switch setting LS1 through LS16) to be on the chosen hardline. As the wordburst always takes precedence, the FM and CD bus outputs are disabled by gates LA5A and LA5D whenever the WB bus is energized, which will be more fully discussed below.

The three analyzers CD, FM and WB (FIGS. 22, 23 and 24) are connected to the respective busses, as illustrated in FIG. 10. The various hardlines 12 are connected to a particular bus through a pole of the three-positioned switch LS1 through LS16. Also, connected to the busses are the test signal generators 16a and 16b, which form part of the signal generator 16. The outputs of the generators are applied to their respective analyzers whenever the switch (not shown) is closed enabling such. The analyzers (FIGS. 22, 23 and 24) are cleared during each C clock, and their outputs are continuously displayed by means of the memory unit (FIG. 16) on the display panel 15. The outputs of each of the analyzers go to a respective set of AND gates, LA30A, LA30B, LA30C, LA30D, LA30E and LA30F (FIG. 25) via the logics circuits (FIGS. 19, 20 and 21). The connection between the circuits are as illustrated in the drawings. With these outputs the indicator lamp L1, L2 and L3 in the memory (FIG. 16) are set to display the particular hardline status. There are three outputs from each analyzer, coded as follows:

1 = 0, 2 = 0 = SET LA18A of the memory. (GOOD)
1 = 1, 2 = 0 = RESET LA18A of the memory. (MARGINAL OR BAD)
1 = 1, 2 = 0 = SET LA18B of the memory. (MARGINAL)
1 = 0, 2 = 0 = RESET LA18B of the memory. (GOOD or BAD)
3 = 1 = ANALYZER MALFUNCTION The output of any analyzer WB, CD or FM (FIGS. 22, 23 and 24) which will be discussed in detail below, is enabled to the memory register illustrated in FIG. 16 whenever its output gates LA30A through LA30F (FIG. 25) are enabled from the output gates of the scan register selection busses labeled WB, CD and FM. During the test phase which is not discussed completely because it does not form a part of invention, the "1" outputs from the analyzer logic circuits (FIGS. 19, 20 and 21) are ANDED in AND gate LB26A to flip-flop LA13C which is enabled by the test phase level by LB17H terminal 25 of the analyzer timing clock counter 27. If the signal generator 16 and the analyzers 17 are operating properly, gate LB26A will have a low output and flip-flop LA13C will not be set. If any output is not high from one of the analyzers via inverters LA29A through LA29F gate LB26A will set flip-flop LA13C causing the system malfunction lamp LT1 to be lit. Flip-flop LA13C will also be set if output "3" entitled analyzer malfunction of any analyzer goes to "1" signifying an analyzer malfunction. The members LB14X, W and V are inverters.

The indicator lamp memory illustrated in FIG. 16 is composed of 16 pairs of flip-flops, LA18A and LA18B. Only one of the indicator lamp registers is disclosed, and it is to be understood there are 16 such, one for each of the hardlines being monitored. The connections throughout the circuit is similar to that discussed herein. The 4C clock signal on pin 2 and pin 9 of the flip-flops LA18A and LA18B, respectively, are connected to the WB strobe or scan strobe through one pole of the three-positioned switch LS1 through LS16. Any pair of LA18A and LA18B is enabled whenever the corresponding hardline of the scan register is selected through the input leading into AND gate 28, 29, 30 and 31 as labeled. The outputs of the scanner gates LA6A through LA6H and LA7A through LA7H (FIGS. 7 and 8) are thus enabled into the pair of flip-flops LA18A and LA18B through the AND gates 28, 29, 30 and 31, and on the next applicable strobe the flip-flops are set as follows:

| SA | SB | |
|---|---|---|
| 1 | 0 | SET A, RESET B (GOOD) |
| 0 | 1 | RESET A, SET B (MARGINAL) |
| 0 | 0 | RESET A, RESET B (BAD) |

The output of flip-flop LA18A illuminates the GOOD lamp L1; the output of flip-flop LA18B illuminates the MARGINAL lamp L2; while, if both flip-flops are reset, the $\overline{0}$ outputs are ANDED and illuminate the BAD lamp L3. Looking at FIG. 16, it can be seen that the $\overline{0}$ sides of the flip-flop LA18A and LA18B labeled 33 and 40, respectively, are fed into AND gate LA22C which, in turn, is fed into AND gate LA22B to a lamp driver AG15 to the lamp L3. The only time gate LA22B is opened allowing lamp L3 to be illuminated is when there is a clock signal coming in on input terminal 3 of AND gate LA22A and an output is received on input terminal 2 of the AND gate LA22A from the continuous monitor circuit as labeled. Two of the output circuits forming part of the continuous monitor circuit is illustrated, and it is to be understood that there are 16 such circuits feeding signals to the appropriate indicator lamp memory (FIG. 16). The clock signal, which was previously mentioned, coming in on inputs 2 and 9 are the flip-flops LA18A and LA18B comes from the strobe signals forming part of the programmer (FIG. 3) as labeled. If the switch LS1 is in the middle position, a strobe signal is received from the wordburst monitor illustrated in FIG. 18, and allows the lamps L1, L2 and L3 to be illuminated only when there is wordburst information. When the switch LS1 is in the uppermost position, as illustrated, then the lamps can be illuminated for either continuous data information or FM information.

THE MONITORS

The monitor register detects the presence or absence of data on the hardlines 12 in each of two modes through switch S17. As can be seen, the switch S17 can be in the open position, as illustrated, or in the grounded position which grounds the gate LB8A. In order for the gate LB8A to be enabled there must also be a ground signal coming in on input terminal 5 and a signal coming in on input terminal 3 from the hardline, filter F1, inverter LB3B.

The continuous monitor consists of 16 level detectors and as previously mentioned, only two LB8A and LB8J are illustrated connected to the level detector sensors, only one of eight being shown. Such includes flip-flop LB5A, input gate LB8A and J, and output gates LB4A. The flip-flop LB5A is merely flipped from one state to the other to indicate which of the memory gates LB8A or LB8J has an output thereon. The output signals from these AND gates are gated into flip-flop LB5A, as illustrated. The output of flip-flop LB5A is fed through another AND gate LB4A with the output of AND gate LB8J and alternately sends signals to the memory (FIG. 16). This particular signal is fed to an input of a gate LA22A of a memory stage, not illustrated.

SINGLE ENDED MODE

The single ended mode is used to detect continuous data on the monitored hardlines 12. If the single ended switch TS4 (FIG. 13) is set to the open position, and the monitored hardlines 12 carry continuous data, as programmed by the closing of a pole of three-positioned switch LS1–LS16 of the scanner (FIGS. 7 and 8), the AND gate LB8A is held disabled by the level detectors through an inverter LB3B. Should the continuous data on a hardline fall below predetermined magnitude values, the respective gates LB8A or LB8J are enabled. The outputs of each monitor which is the output of gate LB4A goes to a respective AND gate LA22A in the memory indicator register as appropriately labeled, enabling the 5 Hz clock to the BAD lamp L3 through the OR gate LA22B.

WORDBURST MONITOR (FIGS. 17 and 18)

This circuit includes means for detecting the presence of a wordburst on any of the hardlines which are connected to the inputs of switches LS1–LS16 as indicated. It consists of flip-flops LB27A through LB27D, LB28A through LB28D, LB29A through LB29D and LB30A through LB30D, the WB strobe counter (the strobe signals coming out the analyzer timing clock counter 27), control flip-flop LA13D (FIG. 18), output gates LA30K, LB9F through LB9J, LB26C through LB26M, clock gate LA30H and reset gates LB21E and LA16. Only one portion of the monitoring system will be discussed since the other portions operate identical therewith. The wordburst monitor must detect the presence of a wordburst on any hardline and switch the WB analyzer to that line. This is the priority scheme of the system. In doing so it interrupts any scan cycle which may be in process. That is the MAJOR, MINOR, etc. Flip-flops LB27A through LB27D, LB28A through LB28D, LB29A through LB29D and LB30A through LB30D are clocked by level detector sensors (not shown) positioned between the hardlines and the switches LS1–LS16, if the particular hardline is designated WB lines by the closing of a pole of the three-position switch (LS1– LS16). When a wordburst appears on a selected line the corresponding flip-flop, for example, LB28D will be set, unless the cycle time-out (FIG. 15) is low signifying that the line has been checked this scan. This is signified by a signal coming in on input terminal 50 feeding through gate 33a into flip-flop LB28D. If the time-out is high, the flip-flop LB28D is set and immediately sets all the flip-flops above it. That means to say that if the flip-flop happened to be LB30A, then all the flip-flops above it in the chain would be set. In case of simultaneous arrival of two or more wordburst from a hardline the flip-flop which is already set takes precedence. When flip-flop LB30A is set it enables flip-flop LA13D which is set on the next MC clock pulse (not shown) of 10 Hz. The output of flip-flop LA13D disables the monitor flip-flop LB28D, for example, through gates LB21E, enables gate LA30M, and enables the WB analyzer logic through LA30H. These connections are appropriately labeled on the drawings. Gate LA30M enables the output gates, for example, LB26L through LA16A. An output appears on an output gate LB26L which is enabled by the set output of its respective flip-flop LB28D, pin 52, and the reset output of the flip-flop below it; for example, LB28C, pin 44. This condition indicates that the respective flip-flop LB28D was set by a WB. The output of the enabled output gate LB26L then goes to the input of the scan register output gates. For example, pin 23 of LA6G for hardline switching. Flip-flop LA13D also enables LA30H and the wordburst strobe counter, generally designated by the reference character 35, begins its count on the next MC clock pulse. The $\overline{CEN}$ output of flip-flop LA13D has disabled the clock counter 27 in the programmer, thus the scan cycle operation is suspended during wordburst priority interrupt. At the end of the interrupt the counter 27 will continue. At 011111 the WB counter 35 strobes the memory (FIG. 16) by the alpha transition of flip-flop LB25C through buffers LB11C, D and LA16O. The WB strobe counter 35 counts to 111000, and enables gate LB10G, (FIG. 18) which disables gate LA30M, disabling the output gates. When 111111 is reached gate LA14F is enabled, enabling gate LA30K which resets the monitor flip-flop, for example, LB28D. Flip-flop LB30A is then reset disabling flip-flop LA13D which is reset on the next MC clock pulse. Resetting flip-flop LA13D sends a reset by the WB enable phase level from the programmer flip-flop LA11C, pin 11 of the mode phase register (FIG. 3). Flip-flop LA13D may also be reset by the manual line check switch (not shown) which places a ground thereon.

The signal generator may be placed on the hardline by conventional techniques so as to replace the signals normally flowing thereover with test signals. The details of such connection are not discussed.

FIG. 15 illustrates one of the WB cycle timers which includes flip-flop LB16D. There are 16 of these flip-flops, however, only one is shown since the operations all are identical. This flip-flop LB16D merely retains the information as to which line has been sampled, and feeds such information to the WB monitor illustrated in FIGS. 17 and 18 previously described. All of the timer flip-flops LB16D are set through gate LB21A when the phase timing clock 19 in the programmer is at 00000. The outputs of the cycle timer flip-flops, for example, LB16D set WB check flip-flops (not shown) with a DC signal. These WB check flip-flops drive a corresponding white lamp on the lamp panel forming part of the display and control panel 15 indicating that a particular hardline has been checked. The WB check flip-flops remain set until set by the programmer reset pushbutton "R" (not shown).

ANALYZER LOGIC

Associated with each of the analyzers WB, FM and CD (FIGS. 22, 23 and 24) is interfacing digital logic which receives the analyzer outputs and codes these outputs for application to the analyzer output gates. For example, the FM analyzer logic is illustrated in FIGS. 20 and 21. This circuit consists of calibration OR gates LA30N through LA30R, input OR gates LB10D through LB10E, flip-flop gates LB4L and LB4M, flip-flops LB7K through LB7L, and output decode gates LB18B and LB18E. The calibration gates LA30N, etc., are used to set the analyzer timing and enable pulses C to the analyzer when the switch TS9 is closed. This calibration gate (FIG. 20) is interposed in the FM analyzer circuit of FIG. 23 between the low and high level detectors and the pulse integrators. Outputs from the analyzer go to the input OR gates LB10D and LB10E (FIG. 21). A zero level from the analyzer will enable its respective OR gate LB10D which will enable the flip-flop gate LB4L. The flip-flops LB7K and LB7L are held reset by the clear level from the programmer flip-flop LA13A pin 33 as labeled, while a hardline is being switched. When the clear level is positive the flip-flop LB7K or LB7L may be set and the flip-flop gates LB18B and LB18E are enabled. If any input OR gates LB10D or LB10E is enabled by the analyzer output the flip-flop LB7K or LB7L is set and the output goes to the analyzer output gates LB18B through LB18E. The code is as follows:

| FFLB7K | FFLB7L | WAVEFORM CONDITION |
|---|---|---|
| RESET | RESET | GOOD |
| SET | RESET | MARGINAL |
| SET | SET | BAD |
| RESET | SET | ANALYZER MALFUNCTION |

CD ANALYZER LOGIC

This circuit (FIGS. 20 and 21) consists of calibration gates LB4N through LB4R, input OR gates LA14H, LB17A, flip-flop gates LB10F through LB10G, flip-flops LB7M, LB16A and output gates LB18C and LB17F. The operation of this circuit is identical to the flip-flop analyzer logic with the exception of the extra rise time inputs through inverters LB14H through LB14L to the input OR gates LA14H and LB17A.

WORDBURST ANALYZER LOGIC

The WB analyzer logic (FIG. 19) consists of enable gate LA16M, WB pulse counter flip-flops LB13C-E, overvoltage counter flip-flops LB13G-H, input OR gates LB17D-E, flip-flop gates LB10L-K, flip-flops 16B-C, and output gates LB18A and LB17G. The WB analyzer logic generates its own clear signal using the WB pulse counter which includes flip-flops LB13C-E. The logic is enabled from flip-flop LA13D pin 53 in the WB monitor (FIG. 18) logic through gate LA16M. This enables the WB pulse counter, LB13C, D, and E, the overvoltage counter LB13G-H and disables the flip-flop gates LB10L-K. The WB pulse counter generally designated by the reference character 36, counts the incoming pulses present on the WB analyzer inputs coming through inverter LA16M. If the count reaches 1000 the flip-flop gates LB10L and LB10K are enabled to gate the analyzer inputs from the input OR gates LB17D-E. The inputs to these gates are from the WB analyzer and the overvoltage counter LB13G-H. The overvoltage counter counts the overvoltage pulses from the analyzer and will enable the input OR gates LB17D and LB17E if the count reaches 11. The outputs of the Flip-flops LB16B-C are then decoded for application to the analyzer output gates LB18A and LB17G. At the end of the WB monitor sequence the WB analyzer logic is reset by flip-flop LB13D (FIG. 18) forming part of the WB monitor.

FM ANALYzer

The analysis of the FM data lines is accomplished by monitoring the amplitude of the FM signal and the base-line stability or bobble. This approach allows the widest flexibility in the alignment of the analyzer. A simplified block diagram of the level detector portion of the FM analyzer is shown in FIG. 23.

The amplitude monitoring portion of the FM analyzer consists of four integrated circuit comparators acting as level detectors 37. Two of the comparators are for low voltage monitoring "MARGINAL and GOOD" line status indication and two comparators act as high voltage monitors, "MARGINAL and GOOD." In both the high and low voltage monitors, the "MARGINAL and GOOD" levels are thresholds or selectable by potentiometer adjustments. All four voltage monitors 37 are followed by pulse integrators 37a and timer circuits 37b which are adjustable from approximately "1" to "100" milliseconds. These timers 37b measure the time that the voltage is out of specification and allow the output indication of the degraded performance only if the signal is out of specification for the selected time.

The bobble monitor consists of a low pass filter and two level detectors. The low pass filter has a 40 db per octave roll-off at 100 cps. This frequency was selected to be above the primary bobble rate and below the lowest normal signal frequency. The output of the filter is monitored by two level detectors ("MARGINAL" and "GOOD"). These levels are adjustable by potentiometers.

An indication of marginal line status from any of the monitors will present a "line marginal" output to the indicator lamps performing part of the memory located on the control and display panel 15. Likewise, an indication of good line status from all three monitors will present a "line good" indication to the lamps on the display and control panel. If any of the monitors fail to provide a "GOOD" or a "MARGINAL" indication, a "line bad" indication will be presented to the indicator lamps on the control and display panel 15.

CONTINUOUS DIGITAL ANALYZER

To determine degraded performance of the continuous digital lines, a waveshape analysis is necessary. Therefore, in addition to an amplitude monitor and a baseline stability monitor, both identical to the FM analyzer's circuits, a waveshape analyzer which monitors pulse rise and fall time, ringing and pulse sag is included. A block diagram of the waveshape monitor of the analyzer is shown since such could be any conventional suitable circuit.

The waveshape monitor consists of two level detectors, 38 and 38a, a high speed "NAND" gate 39, a pulse integrator 40, and a pair of pulse width discriminators 41 and 42. The level detectors 38 and 38a drive the "NAND" gate 39 so that the gate output is a series of pulses corresponding to the signal transition between (+) and (−). The width of each pulse is proportional to the time taken to make the transition between the preset levels, or the pulse rise time or fall time. These "NAND" gate output pulses are then fed to the pulse width discriminators 41 and 42 which then gives an output indication, "MARGINAL" or "GOOD," depending upon the acceptable pulse widths set with potentiometer adjustments. This analyzer also tests for ringing and sag since either of these conditions will appear as an excessive pulse fall time.

As in the FM analyzer, all monitors-waveshape, amplitude and baseline stability must register good to give "line good" indication to the lamps in the display and control panel 15 and a single marginal indication will give a "line marginal" indication in the display and control panel 15. The lamps will indicate a bad line if any monitor fails to show at least a marginal status.

WORDBURST ANALYZER

The wordburst analyzer is similar in design to the continuous digital analyzer and may be any conventional suitable circuit, and includes the circuits for measuring pulse rise time and overvoltage. Signals coming in over wordburst bus illustrated in the scanner section is fed through a (+) voltage level detector and a (−) voltage level detector 43 and 43a for determining if the signal is within a predetermined range. If such is true, signals are fed to the NAND high speed gate 44 and the remainder of the circuit operates identical to the description applied to the continuous digital analyzer.

The signal coming in on the WB bus is also applied to a comparator 49 and a level detector 50. If the voltage coming in to the level detector 50 is over a predetermined voltage set therein, a signal is sent to the overvoltage detector in the WB logic (FIG. 19), and is counted to maintain a count of the number of times the voltage exceeds that limit, for the purpose of ultimately illuminating a light on the display and control panel 15. The comparator receives the voltage coming across the wordburst bus and, if the voltage exceeds a certain level, such indicates that it is a WB signal. The comparator then sends a count to the wordburst counter 36 through gate LB10M so as to maintain a count of the number of WB appearing on the WB bus.

We claim:

1. An apparatus for monitoring a plurality of hardlines in order to determine if the information being transmitted comes within certain predetermined tolerances comprising:
    A. an electronic scanner coupled to said hardlines for selectively making connection with said hardlines;
    B. an analyzing circuit coupled to said scanner;
    C. a plurality of hardline selection switches;
    D. means for setting said selection switches to select the hardline upon which the scanning cycle begins and ends,
    E. means for coupling said hardlines to said selection switches;
    F. said scanner including;
        1. a plurality of input strobe gates;
        2. means for coupling said selection switches to said input strobe gates;
        3. a ring counter having a plurality of stages; and 4. means for coupling the output of each of said strobe gates to a respective stage of said ring counter for enabling a particular sequence of stages according to the setting on said selection switches;

G. said analyzing circuit including analyzers for generating signals indicative of the condition of said information being transmitted over said hardlines;

H. means for interrupting the scanning operation when a particular type of information is being transmitted over one of said hardlines;

I. means for coupling at least one of said analyzers to said one of said hardlines for analyzing said particular type information while said scanning operation is interrupted; and J. means for resuming the scanning operation after said particular information has been analyzed.

2. The apparatus as set forth in claim 1 further comprising:
A. a plurality of output gates coupled to respective stages of said ring counter, and
B. said analyzers being coupled to said output gates for analyzing information on predetermined hardlines according to when said output gates are enabled by said ring counter.

3. The apparatus as set forth in claim 2 further comprising:
A. a plurality of random scan gates interposed between respective stages of said ring counter and said output gates for blocking signals from said ring counter to said output gates when said random scan gates are disabled.

4. The apparatus as set forth in claim 3 further comprising:
A. a random scan register coupled to said ring counter for being enabled when said scan gates are disabled, and
B. a patchboard coupled between said random scan register and said output gates for setting up minor random scan sequences of said hardlines.

5. The apparatus as set forth in claim 2 further comprising:
A. a memory register coupled to the output of each of said output gates and said analyzers;
B. said memory register including lamp means for being illuminated indicative of the condition of said information being transmitted on said hardlines.

6. An apparatus for monitoring a plurality of hardlines in order to determine the condition of information being transmitted thereover comprising:
A. a plurality of selection switches coupled to said hardlines for selecting a predetermined group of said hardlines to be monitored;
B. a ring counter having a plurality of stages;
C. means for coupling said hardlines to said stages of said ring counter through said selection switches;
D. means for sequentially enabling said stages of said ring counter for scanning said hardlines coupled thereto;
E. a plurality of output gates coupled to respective stages of said ring counter;
F. a plurality of bus bars coupled to said output gates, one of said bus bars for each different type of information to be analyzed;
G. an analyzer coupled to each of said bus bars for analyzing a particular type of information appearing on said bus bars;
H. switch means interposed between said output gates and said bus bars for selectively connecting said output gates to a particular bus bar so that information can be fed to a designated one of said analyzers, and
I. memory means coupled to said output gates and said analyzers for generating a signal indicative of the condition of the information being transmitted over a particular hardline.

7. The apparatus as set forth in claim 6 further comprising:
A. a plurality of random scan gates interposed between respective stages of said ring counter and said output gates for blocking signals from said ring counter to said output gates when said scan gates are disabled;
B. a random scan register means coupled to said ring counter being enabled when said scan gates are disabled; and
C. a patchboard coupled between said random scan register means and said output gates for setting up minor random scan sequences of said hardlines.

8. The apparatus as set forth in claim 7, wherein said analyzers include:
A. an analyzer for analyzing wordburst signals.

9. The apparatus as set forth in claim 7, wherein said analyzers include:
A. an analyzer for analyzing continuous data signals, and
B. an analyzer for analyzing frequency modulated signals.

10. The apparatus as set forth in claim 9, wherein said analyzers further include:
A. an analyzer for analyzing wordburst signals;
B. means for interrupting said scanning operation when a wordburst signal appears on a hardline, and
C. means for automatically switching said wordburst analyzer to said hardline upon which said wordburst signal appears.

* * * * *